US006766699B2

(12) United States Patent
Swartzel et al.

(10) Patent No.: US 6,766,699 B2
(45) Date of Patent: Jul. 27, 2004

(54) SYSTEM FOR MEASURING RESIDENCE TIME FOR A PARTICULATE CONTAINING FOOD PRODUCT

(75) Inventors: Kenneth R. Swartzel, Raleigh, NC (US); Josip Simunovic, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 24 days.

(21) Appl. No.: 10/396,912

(22) Filed: Mar. 25, 2003

(65) Prior Publication Data

US 2003/0177842 A1 Sep. 25, 2003

Related U.S. Application Data

(62) Division of application No. 09/443,715, filed on Nov. 19, 1999, now Pat. No. 6,536,947, which is a division of application No. 09/301,921, filed on Apr. 29, 1999, now Pat. No. 6,015,231, which is a division of application No. 08/946,277, filed on Oct. 7, 1997, now Pat. No. 5,932,813.

(51) Int. Cl.[7] .......................... G01F 1/708; G01R 33/12
(52) U.S. Cl. ..................... 73/861.05; 324/204; 324/260
(58) Field of Search ................. 324/207.22–207.24, 324/260, 263, 207.11, 224, 244, 262; 73/861.05, 861.08, 866; 99/342; 426/231

(56) References Cited

U.S. PATENT DOCUMENTS

| | | | |
|---|---|---|---|
| 2,631,242 A | 3/1953 | Metcalf | |
| 3,406,569 A * | 10/1968 | Rohmann | 73/861.12 |
| 3,965,741 A | 6/1976 | Wachtell et al. | |
| 4,215,342 A | 7/1980 | Horowitz | 340/572 |
| 4,541,719 A | 9/1985 | Wyatt | 356/343 |
| 4,766,373 A * | 8/1988 | Chambers et al. | 324/204 |
| 4,841,244 A * | 6/1989 | Chambers | 324/204 |
| 4,948,277 A * | 8/1990 | Alff | 384/448 |
| 5,000,569 A | 3/1991 | Nylund | 356/237 |
| 5,021,981 A | 6/1991 | Swartzel et al. | 324/178 X |
| 5,080,164 A | 1/1992 | Hermans | 165/2 |

(List continued on next page.)

FOREIGN PATENT DOCUMENTS

| | | | | |
|---|---|---|---|---|
| EP | 371836 A1 * | 6/1990 | | 324/162 |
| FR | 2155057 | 5/1973 | | |
| JP | 2-161360 | * | 6/1990 | 73/861.08 |
| JP | 5-264163 | * | 10/1993 | 62/127 |

OTHER PUBLICATIONS

Palaniappan et al., "Aseptic Process Validated for Foods Containing Particulates," *Food Technology*, vol. 51, No. 8, pp. 60–68 (Aug. 1977).

(List continued on next page.)

*Primary Examiner*—Thomas P. Noland
(74) *Attorney, Agent, or Firm*—Jenkins, Wilson & Taylor, P.A.

(57) ABSTRACT

A method of generating a residence time measurement of a particulate-containing food product while passing the product as a continuous stream through a thermal processing apparatus is described. The method includes the steps of inserting at least one detectable particle, and preferably many detectable particles, tagged with at least one magnetic implant into the stream at pre-selected intervals; detecting the at least one implant using at least one sensor located at a detection point downstream from a location of the inserting of the at least one detectable particle; determining a time of passage of the at least one detectable particle in the stream using output from the at least one sensor; and generating a residence time measurement for the stream using the time of passage for the at least one detectable particle. The method also includes the use of multiple sensors for detecting the implants. A suitable system and detectable particle for carrying the method are also described.

8 Claims, 12 Drawing Sheets

U.S. PATENT DOCUMENTS

| | | | |
|---|---|---|---|
| 5,129,606 A | * 7/1992 | Rodems et al. | 246/249 |
| 5,159,564 A | 10/1992 | Swartzel et al. | 324/178 R |
| 5,261,282 A | 11/1993 | Grabowski et al. | 73/861.05 |
| 5,407,269 A | 4/1995 | Sherry et al. | |
| 5,425,819 A | 6/1995 | Oohashi et al. | 148/300 |
| 5,739,437 A | 4/1998 | Sizer et al. | 73/861.05 |
| 5,741,979 A | 4/1998 | Arndt et al. | 73/861.05 |
| 5,750,907 A | 5/1998 | Botos et al. | 73/865.8 |
| 5,761,916 A | * 6/1998 | Oswalt et al. | 62/127 |
| 5,801,630 A | 9/1998 | Ho et al. | 340/572 |
| 5,876,771 A | 3/1999 | Sizer et al. | 426/231 |

OTHER PUBLICATIONS

Palaniappan, "Food for Thought," *Resource,* pp. 13–14 (Aug. 23, 1997).

Segner et al., "Biological Evaluation of a Heat Transfer Simulation for Sterilizing Low–Acid Large Particulate Foods for Aseptic Packaging," *Journal of Food Processing and Preservation,* pp. 257–274 (Apr. 23, 1989).

Tucker et al., "Determination of Residence Time Distribution of Food Particles in Voscous Food Carrier Fluids Using Hall Effect Sensors," Technical Memorandum No. 667, The Campden Food and Drink Research Association, pp. 1–43 (Dec. 23, 1992).

Tucker et al., "Residence Time Distribution and Flow Behavior of Foods Conaining Particles in Aseptic Processing," AlChemE Conference of Food Engineering, pp. 1–12 (Feb. 23, 1993).

"GMR Sensor Application Notes," Nonvolatile Electronics, Inc., Sensor Engineering and Application Notes, pp. 1–31 (Oct. 1996).

"Case Study for Condensed Cream of Potato Soup," Aseptic Processing of Multiphase Foods Workshop (Nov. 1995–Mar. 1996). pp. E–EX, 1–21 & Figs. 1–5.

European Search Report dated Oct. 10, 2000 for corresponding European application No. EP 98937153.

* cited by examiner

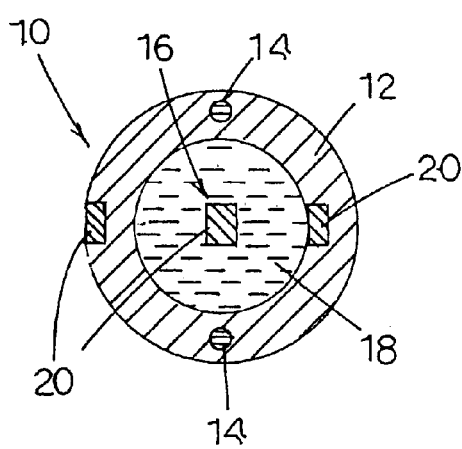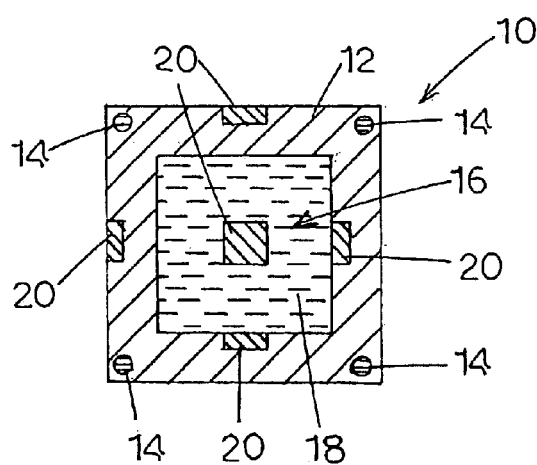
Fig. 1A      Fig. 1B
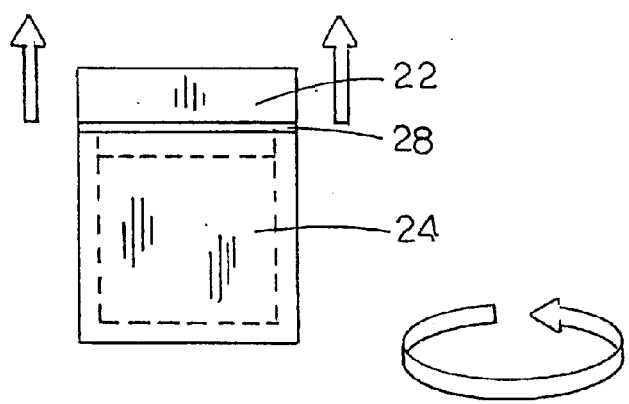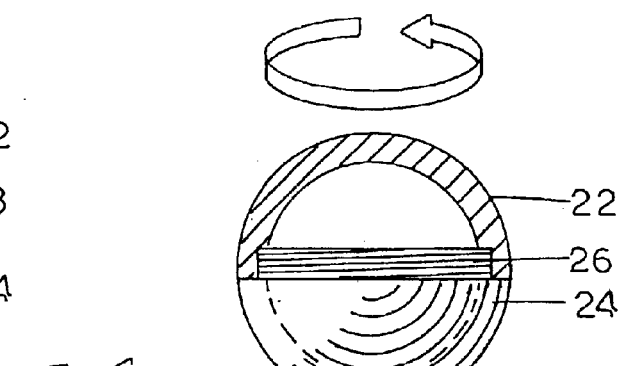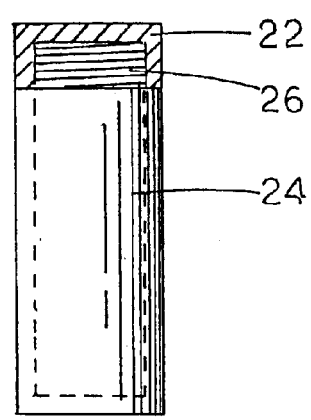
Fig. 2A      Fig. 2B      Fig. 2C

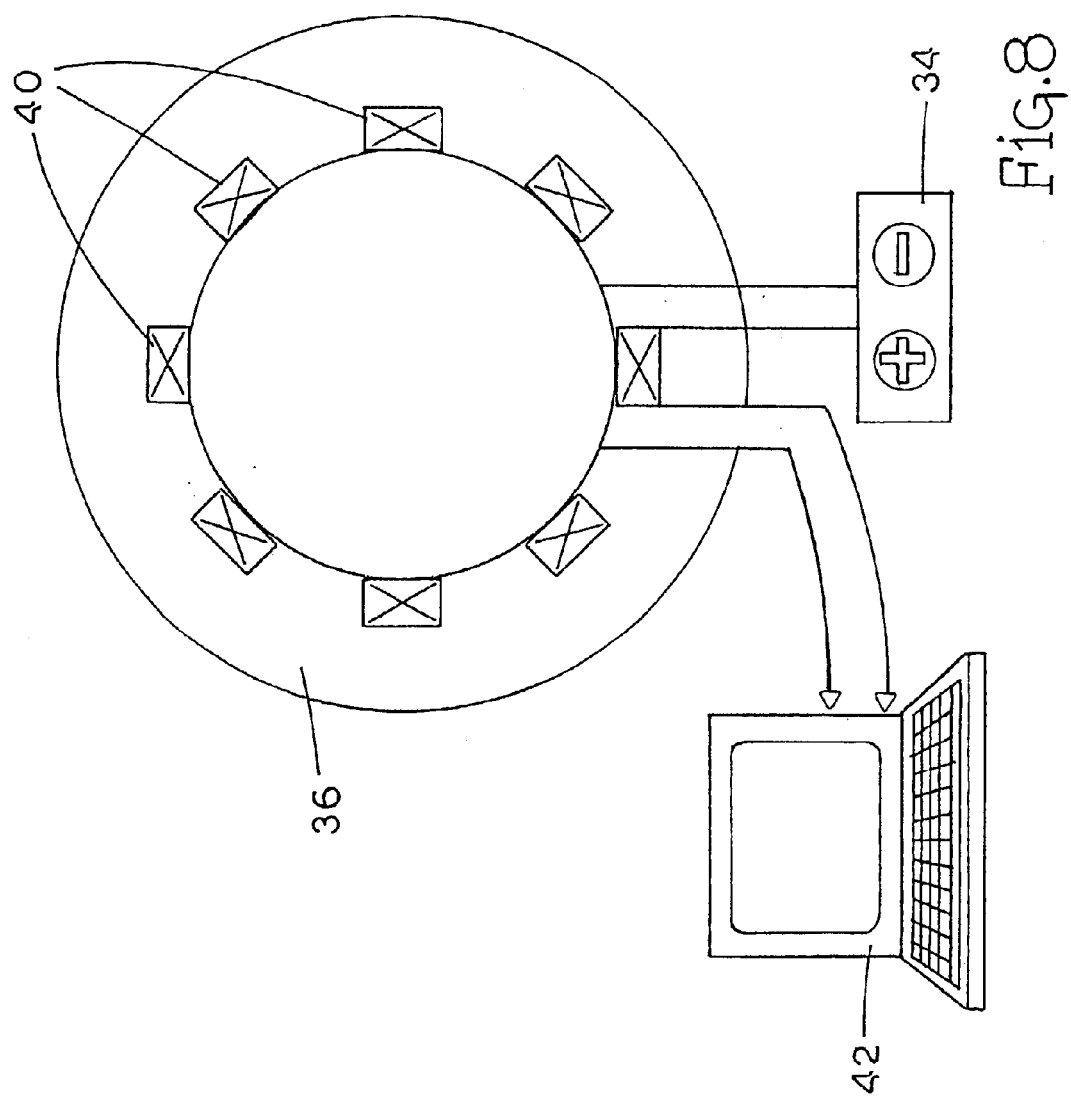

SYSTEM FOR MEASURING RESIDENCE TIME FOR A PARTICULATE CONTAINING FOOD PRODUCT

This application is a Divisional of U.S. patent application Ser. No. 09/443,715 filed Nov. 19, 1999, and now U.S. Pat. No. 6,536,974 which is a Division of U.S. patent application Ser. No. 09/301,921 filed Apr. 29, 1999, (now U.S. Pat. No. 6,015,231) which is a Divisional of prior U.S. patent application Ser. No. 08/946,277 filed Oct. 7, 1997, now U.S. Pat. No. 5,932,813, the contents of each of which are herein are incorporated by reference.

This work was supported by the National Science Foundation (NSF) pursuant to contract number MCB 9631375. The U.S. Government has certain rights in the invention.

TECHNICAL FIELD

The present invention relates generally to continuous thermal processing of a particulate-containing food product, and more particular to a method and system for generating residence time measurements for such processes, and a detectable particle for use in such a method and system.

BACKGROUND ART

It will be appreciated by those having ordinary skill in the art that thermal processing of particulate-containing food products is difficult to accomplish in an efficient but effective manner. Particulate-containing food products are also described in the art as multi-phase food products, or as multi-phase foods, in that these products include liquids and solids.

Traditionally, thermal processing of particulate-containing food products involved the placing of the product in individual cans, followed by thermal treatment of the product within the can. The process is generally effective in removing microbial contamination and in providing a food product that is safe for consumption. However, this process is labor and machinery-intensive and time-consuming. Thus, this process lacks efficiency.

Continuous thermal processing generally involves the thermal processing of the food product as a stream or flow in one line while processing the containers or cans in which the food will be stored in another line. The food product is then placed in the container under appropriate conditions wherein microbes and their spores are excluded. Continuous thermal processing thus enables unlimited package size, yielding increased efficiencies and reduced costs to the industry and ultimately to the consumer. Continuous thermal processing is sometimes also called aseptic processing in the art.

However, it is very difficult to uniformly treat all fluid elements of the food product flowing in a continuous process. This difficulty is exacerbated in the case of a multi-phase food product in that there are variations in speed for each solid food particle flowing through the process. Thus, the residence time of each food particle in the flow is a difficult variable to characterize.

As is known in the art, the residence time for a particle in a multi-phase food product traveling through a continuous thermal processing line is that amount of time that the particle resides in a given length or section of the line, or in the entire line itself. Residence time is an important variable because, among other things, it is necessary to the calculation of the lethality per particle for the continuous thermal process. As is also known in the art, lethality can be calculated as a function of time using several equations that require temperature and residence time measurements, among other measurements. Stated differently, lethality is that amount of time a particle is subjected to a temperature sufficient to kill a microbe common to food particles and its spores. An example of such a microbe is *Clostridium botulinum*.

It is particularly important to capture the residence time measurement for the fastest particle traveling through the process. For the fastest particle, the risk of insufficient lethality is great. Optionally, the food stream can be subjected to excessive heat in the thermal process, but this results in food product that is, in effect, overcooked and therefore not palatable to the consumer. This option is not viable in a commercial setting.

The problems of continuous thermal processing of multi-phase food products are more fully discussed in Tucker, C. S. and Withers, P. M., "Determination of Residence Time Distribution of Food Particles in Viscous Food Carrier Fluids using Hall effect sensors", *Technical Memorandum 667, Campden Food and Drink Research Association (CFDRA)*, Campden, Glos., U.K. (1992) and in "Case Study for Condensed Cream of Potato Soup", *Aseptic Processing of Multi-phase Foods Workshop*, Nov. 14–15, 1995 and Mar. 12–13, 1996 (published 1997).

Because of the above referenced difficulties, in the United States each continuous thermal process for use in the treatment of food must be described in a document to be filed with the United States Food and Drug Administration (FDA) for approval before it can be implemented in industry. Because of the problems associated with uniform treatment in the continuous thermal process, the FDA subjects these documents, hereinafter referred to as "FDA process filings", "process filings" or "FDA filings", to rigorous scrutiny.

To gain FDA approval, a process filing must demonstrate biovalidation of the process, among other information. As in known in the art, biovalidation refers to data showing that the process was effective in removing contamination of the food product by microbes and their spores. To determine biovalidation, conservative residence time distribution measurements are required. Lengthy test runs must be performed to generate the conservative residence time distribution measurements. Such test runs require a great deal of time and involve the loss of a great deal of the food product, as the food product that is part of the test run cannot be salvaged. The time required for and food product lost in such test runs have prevented the wide scale adoption in the industry of continuous thermal processing of particulate-containing food products.

There have been several attempts to provide methods and systems for characterizing residence time in continuous thermal processing of particulate-containing food products that reduce the time and amount of food product required to validate the process. Currently available methods and systems use the detection of a detectable particle. By the term "detectable particle" it is meant a particle that includes a tracer component that is detectable by sensors used in the method and system and that is attached to or integrated into a carrier component or medium of the particle. The particle is then introduced into the food stream of the continuous thermal process for detection.

Examples of the tracer element include magnetic tracer materials which comprise magnetic particles and metal powders. The particles or powders are mixed in a matrix of solidified plastic polymer or into a an alternative medium such as an alginate gel.

These magnetic tracer materials are only partially compatible with their intended use for measurements of residence time of food particles. Their high density causes an increase in the density of loaded particles which leads to an underestimate of particle velocity. This can lead to an overestimate of hold times and thus yield a calculated process of insufficient lethality to microorganisms and their spores in the food product being processed.

For example, Segner et al., "Biological Evaluation of a Heat Transfer Simulation for Sterilizing Low-Acid Large Particulate Foods for Thermal Packaging", *Journal of Food Processing and Preservation*, 13:257–274, (1989), reported the use of magnetic implants to tag food particles and measure residence times in thermal systems. Wound copper coils were used as sensor elements, and a single type of magnetic implant was used in the detectable particles. No density compensation for the detectable particles was implemented. The problems with the use of wire coils as magnetic sensors include low sensitivity and low detection reliability at low particle velocities since magnetic flux is detected rather than magnetic field. This approach was followed in "Case Study for Condensed Cream of Potato Soup", *Aseptic Processing of Multi-phase Foods Workshop*, Nov. 14–15, 1995 and Mar. 12–13, 1996 (published 1997), referenced above.

Tucker, G. S. and Richardson, P. S., "Residence Time Distribution and Flow Behavior of Foods Containing Particles in Thermal Processing", *AIChem.E Conference on Food Engineering*, Chicago (21–24, Feb. 1993) (Poster Paper) describes the use of multiple Hall effect sensors mounted around line tubes at different locations to detect the time of passage of magnetically tagged particles through the tube during continuous flow thermal processing. No density compensation of particles was used, and a single particle tag type was applied in detection. Hall effect sensors are more sensitive than wound coil detectors; but, these sensors cannot be used at thermal processing temperatures and have to be positioned a distance away from the tube. This limitation reduces the useable sensitivity. This approach is also described in Tucker, G. S. and Withers, P. M., "Determination of Residence Time Distribution of Food Particles in Viscous Food Carrier Fluids using Hall effect sensors", *Technical Memorandum 667, Campden Food and Drink Research Association (CFDRA)*, Campden, Glos., U.K. (1992), referenced above.

U.S. Pat. No. 5,261,282, issued to Grabowski et al. on Nov. 16, 1993, describes the use of implanted radio frequency transponders to monitor residence times of simulated pasta particles (macaroni) in a continuous thermal system. Multiple transponder i.d. signals were used and density compensation to the carrier fluid density (neutral buoyancy) was applied. The system is limited to large, preferably hollow food particle types due to the size and weight of transponder implants. Additionally, transparent (glass or plastic) tube inserts are necessary to allow for the signal penetration and to enable the detection by external detectors.

Palaniappan et al., "Thermal Process Validated for Foods Containing Particulates", *Food Technology*, Vol. 51, No. 8, (August 1997) pp. 60–68 used essentially the identical tagging and detection system as described by Segner et al. (1989), but implemented density compensation to the carrier fluid density of the food stream. A single magnetic implant type was used. This work was promising in that it produced the a FDA filing, prepared by Tetra Pak Inc., that received a letter of no rejection from the FDA. This was the first such letter ever issued by the FDA for continuous thermal processing of a multi-phase food product. However, this method, as well as the methods described above, uses a single magnetic tagging implant type and requires that the particle clear the entire observed system or system segment before the next particle is inserted to prevent misidentification. Additionally, all systems using wound coils as sensors are susceptible to occasional non-detection due to low sensitivity and problems at lower velocities.

U.S. Pat. No. 5,021,981 issued to Swartzel et al. on Jun. 4, 1991 and in U.S. Pat. No. 5,159,564 issued to Swartzel et al. on Oct. 27, 1992 each describe method for determining the thermal history of an object, such as a particle of food being treated in a food processing apparatus, and thermal memory cells useful in carrying the methods. The thermal history is determined by detecting changes, after exposure of the object to a thermal treatment, in two thermal calibration materials that have different activation energies and that are placed in or coupled to the object.

Therefore, none of the attempts in the prior art have provided the food processing industry with a method and system that provide a conservative profile of the behavior of food particles in a continuous thermal flow of a particulate-containing food product in real time and in a cost-effective manner; that do not require the use of excessive amounts of food product and time; and that function with a variety of thermal processing systems. Indeed, a suitable detectable particle would have the size and density to provide a conservative residence time measurement as compared to the food particle (i.e., potato, beef cube, etc.) of interest, while containing a sufficient level of magnetic material loading to enable reliable entry and exit detection under realistic processing conditions. By "conservative residence time measurement", it is meant that residence time measurement with the highest likelihood of containing the fastest particle. Such a detectable particle is lacking in the prior art.

What is also needed is a method and system that can conservatively model and calculate residence time in continuous thermal processing of particulate-containing food products. Such a method and system are lacking in the prior art.

DISCLOSURE OF THE INVENTION

A method of generating a residence time measurement of a particulate-containing food product while passing the product as a continuous stream through a thermal processing apparatus is described. The method comprises the steps of: inserting at least one detectable particle tagged with at least one detectable magnetic implant into the stream at preselected intervals; detecting the at least one implant using at least one sensor located at a detection point downstream from a location of the inserting of the at least one detectable particle; determining a time of passage of the at least one detectable particle in the stream using output from the at least one sensor; and generating a residence time measurement for the stream using the time of passage for the at least one detectable particle. Alternatively, a plurality of detectable particles can be inserted into the stream at pre-selected intervals, wherein each detectable particle includes a detectable magnetic implant.

Preferably, the sensor has a sensitivity such that the sensor is capable of detecting a magnetic field of at least as low as 0.05 oersteds, and can detect the detectable particle when the detectable particle has a lower speed boundary of zero velocity. The sensor can also have a sensitivity such that the sensor is capable of detecting a magnetic field ranging from at least as low as 0.05 oersteds to about 20 oersteds.

The method can further comprise providing a detectable particle wherein at least one physical parameter of the particle that effects behavior of the particle in the stream is adjusted to provide a conservative residence time measurement. The physical parameter can be selected from a group including, but not limited to, density, size, shape and combinations thereof. The density of the particle is preferably adjusted to a target density wherein the target density is that density with the highest likelihood of including a fastest particle.

In the method of this invention, the magnetic implant can comprise a material including, but not limited to, neodymium iron boron, cobalt rare earth, aluminum-nickel, ceramic, organic, plastic-embedded metal or ceramic and combinations thereof. Further, the pre-selected intervals for inserting the detectable particles can be selected to maximize a number of inserted detectable particles per unit time and to minimize time and quantity of the stream used to generate the residence time measurement. Additionally, the at least one sensor can be placed proximate to the stream using a gasket.

The method can further comprise placing additional sensors at the detection point; and determining the time of passage in the stream for the at least one detectable particle in the stream using output from each sensor. The method can also further comprise placing additional magnetic sensors at at least one additional detection point downstream from the location of the inserting of the detectable particles; and determining the time of passage in the stream for the at least one detectable particle in the stream using output from each sensor.

The method can also further comprise placing additional magnetic sensors at a plurality of additional detection points downstream from the location of the inserting of the at least one detectable particle; and determining the time of passage in the stream for the at least one detectable particle in the stream using output from each magnetic sensor.

When a plurality of detectable particles are injected into the stream, the method of this invention can also comprise the step of calibrating each of the sensors with a magnetic field of each of the detectable particles, such that each sensor detects a different range of magnetic field strengths of the particles and/or a different range of magnetic identifications for the particles.

Each of the plurality of particles can also include a different magnetic implant, such that each particle has a different magnetic identification, as defined herein. The different magnetic implants can vary according to a physical parameter selected from the group including, but not limited to, the number of implants within the particle, size of implant, shape of implant, mass of implant, magnetic material used, location of implant within the particle, and combinations thereof.

A system suitable for carrying out the method of this invention is also described.

A sensor assembly for detecting a detectable particle used in measuring residence time for a particulate-containing food product while passing the product as a continuous stream through a thermal processing apparatus is also described. The sensor assembly comprises a gasket and at least one magnetic sensor mounted within the gasket. Alternatively, a plurality of sensors can be mounted within the gasket.

A combination comprising a detectable particle and a sensor for use in evaluating thermal treatment for a particulate-containing food product while passing the product as a continuous stream through a thermal processing apparatus is also described. The detectable particle comprises a detectable magnetic implant and a carrier, and the sensor is capable of detecting a magnetic field of at least as low as 0.05 oersteds. The sensor can also be capable of detecting a magnetic field ranging from at least as low as 0.05 oersteds to about 20 oersteds.

The particle can further comprise at least one additional magnetic implant. The at least one additional magnetic implant can differ from the other magnetic implant according to a physical parameter including, but not limited to, size, shape, mass, magnetic material used, location within the particle and combinations thereof.

At least one physical parameter of the particle that affects behavior of the particle in the stream can be adjusted to provide a conservative residence time measurement. In this case, the physical parameter includes, but is not limited to, density, size, shape and combinations thereof. Indeed, the density of the particle is preferably adjusted to a target density wherein the target density is that density with the highest likelihood of including a fastest particle.

The magnetic implant of the particle can comprise a material including, but not limited to, neodymium iron boron, cobalt rare earth, aluminum-nickel, ceramic, organic, plastic-embedded metal or ceramic and combinations thereof. The magnetic implant can have a configuration selected from the group including, but not limited to, a circle, a sphere, a tetrahedron, an asterisk, a cross, a cube, a triangle, a pyramid, a square, a rectangle, and combinations thereof.

The carrier component of the particle can comprise material selected from the group including, but not limited to, polystyrene, copolymers thereof, polypropylene, copolymers thereof, and combinations of polystyrene, copolymers thereof, polypropylene and copolymers thereof. The carrier can also comprise a container. In this case, the container can further comprise a lid, a body and a gasket, the gasket cooperating with the lid and the body to form a seal between the lid and the body. The carrier can also comprise an actual food particle.

The particle can further comprise a cargo component. The cargo component can be selected from the group including, but not limited to, an inert material, a thermal memory cell, a microbial load, an actual food particle, a thermal pill, a thermal insulating material, a transponder and combinations thereof.

Accordingly, it is an object of this invention to provide a method and system for generating a residence time measurement of a particulate-containing food product while passing the product as a continuous stream through a thermal processing apparatus.

It is another object of this invention to provide a detectable particle for use in such a system wherein the size and density of such particle has been compensated to provide a conservative residence time measurement as compared to the food particle (i.e., potato, beef cube, etc.) of interest, while containing a sufficient level of magnetic material loading to enable reliable entry and exit detection under realistic processing conditions. By "conservative residence time measurement", it is meant that residence time measurement with the highest likelihood of containing the fastest particle.

It is a further object of this invention to provide such a method and system wherein the sensors are sufficiently sensitive and are configured to pick up extremely low signal levels.

It is still a further object of this invention to provide such a method and system wherein a detectable particle comprises multiple shapes and wherein multiple detectable particles can be used to generate the residence time measurement.

It is yet a further object of this invention to provide a method and system for characterizing residence time for a particulate-containing food product while passing the product as a continuous stream through a thermal processing apparatus such that appropriate velocities and hold times that provide for the killing of microorganisms and their spores in the food product are determined and utilized for the stream.

It is still another object of this invention to provide a method and system that can be implemented under normal processing run conditions to evaluate thermal treatment of the stream as a part of the regular quality control procedure for regular production runs, in addition to facilitating fulfillment of requirements for a process filing as required by the FDA.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 1 is a cross-sectional view of two of the detectable particles of the instant invention;

FIG. 2 is a front elevation view of the detectable particles of this invention wherein the particles comprise three different representative shapes;

FIG. 8 is a schematic cross-sectional view of the system of this invention as depicted in FIG. 7;

DETAILED DESCRIPTION OF THE INVENTION

Figure 3A:
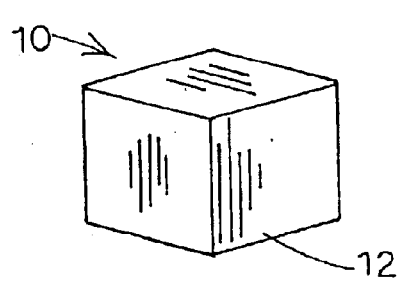
FIG. 3 is a perspective view of a collection of the detectable particles of this invention wherein the particles comprise four different representative shapes.
Figure 3B:
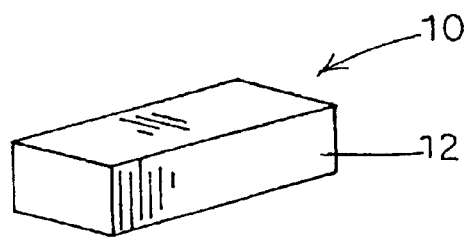
Figure 3C:
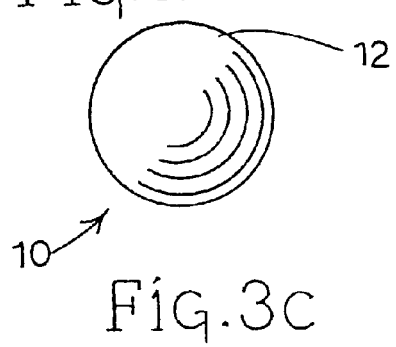
Figure 3D:
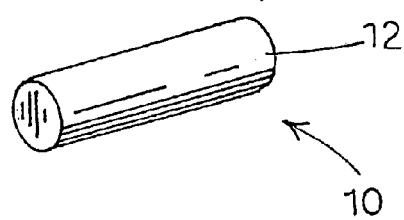

In the method and system of this invention, detectable particles providing conservative (high velocity) flow characteristics are tagged with several different sizes and spatial configurations of single or multiple magnetic implants. By the term "conservative", it is not necessarily meant the detectable particle should simulate or mimic exactly the behavior of an actual food particle in the flow. Rather, by the term "conservative", it is meant the particle is engineered to provide the highest probability of detecting the fastest particle in the flow. Stated differently, then, it is an objective of this invention to conservatively simulate or mimic the behavior of an actual food particle.

Thus, the detectable particles used in the method and system are also an aspect of this invention. By the term "detectable particle" it is meant a particle that includes a tracer or insert component that is detectable by sensors used in the method and system. The insert component is attached to or integrated into a carrier component or medium of the particle.

The particles of this invention have been engineered so that their density is compensated to a predetermined level. The particles can be of uniform size and shape, or can vary in size or shape. The objective is to provide a detectable particle having the size and/or density to provide a conservative residence time measurement as compared to the food particle (i.e., potato, beef cube, etc.) of interest, while containing a sufficient level of magnetic material loading to enable reliable entry and exit detection under realistic processing conditions. By "conservative residence time measurement", it is meant that residence time measurement with the highest likelihood of containing the fastest particle.

Thus, in the preferred embodiment, when it is said that the density of the particle is compensated to a predetermined or target level, it is meant that density which provides for a conservative residence time measurement. Further, choices for particle size, shape and density adjustment as presented herein are made with the objective of providing a conservative residence time measurement in mind.

Each detectable particle preferably comprises a carrier component, a detectable component, and a cargo component. Thus, the mass of the carrier component plus the mass of the detectable component plus the mass of the cargo component equals the mass of the particle.

Referring now to FIGS. 1–13, wherein like reference numerals refer to like parts throughout, and particularly referring to FIG. 1, the detectable particle of this invention is generally referred to as 10. Particle 10 comprises a carrier component 12 that is depicted as a hollow container.

Carrier 12, which is designated with diagonal hatching in FIG. 1, comprises a material that is susceptible to precision manufacturing through machining and insertion molding. It is also preferred that carrier 12 be stable at ultra high temperatures. Additionally, carrier 12 can also be reusable so as to be amenable to multiple applications. Suitable examples of material for carrier 12 include polypropylene, polypropylene copolymer, or combinations thereof. The preferred density of the material is approximately 0.9 g/ml.

Continuing on FIG. 1, particle 10 further comprises detectable components 14. Detectable components 14 comprise magnetic implants that are embedded within the walls of carrier 12. In FIG. 1, magnetic implants 14 are designated by circles with horizontal hatching.

Magnetic implants 14 can comprise any magnetic material, whether currently known or subsequently discovered. An example of a suitable material can be selected from the group including, but not limited to, neodymium iron boron, cobalt rare earth, aluminum-nickel, ceramic, organic, plastic-embedded metal and ceramic and combinations thereof. Other examples would be apparent to one having ordinary skill in the art.

It is noted that magnetic implants 14 can be in any suitable shape and configuration. Examples include, but are not limited to, square, block, triangular, pyramidal, spherical, circular, tetrahedron, needle, coil and combinations thereof. Further, while the implants 14 are shown in FIG. 1 as embedded in the walls of carrier 12, implants 14 can also be placed within the internal void space of the carrier 12, or otherwise suitably mounted within carrier 12.

Magnetic implants 14 preferably comprise neodymium iron boron. Neodymium iron boron is a preferred example because it is commercially available in particles of various shapes and sizes and has a high magnetic field strength per unit mass. A commercial source of such magnets is Permag, a division of The Dexter Corporation, 1150 Kifer Road, Suite 201, Sunnyvale, Calif. 94086. A particularly suitable example of implant 14 is available from Permag as Part Number 9054248. This part number is particularly suitable because it represents the smallest and weakest magnetic implant 14 that can be detected by the sensors used in the method and system of this invention. Therefore, this part number is particularly suited for use in the particle and system configurations described more fully below. The preferred implant 14 is also described in Table 1.

TABLE 1

Preferred example of implant 14 - Available from Permag, 1150 Kifer Road, Suite 201, Sunnyvale, CA 94086 as Part Number 9054248, neodymium iron boron, mass 0.035 g.

In each embodiment of the particle 10 described herein, the mass and shape of each magnetic implant 14 is preferably chosen according to a desired magnetic identification (also referred to herein as "magnetic i.d.") for a particle 10. By the term "magnetic identification" is meant that magnetic field or fields generated by individual magnetic implants or by combinations of multiple magnetic implants included within particle 10 such that an individual particle 10 can be detected according to the magnetic fields generated by the implant or implants 14.

For example, the mass of implant 14 can be as small as can be detected by suitable sensors as described herein, and can be increased according the size and mass of the actual food particle that the practitioner is trying to conservatively simulate or mimic. Generally, the magnetic field of an implant 14 increases as the mass of the implant 14 increases. Therefore, different magnetic fields, and thus, different magnetic i.d.s can be produced by including implants of varying mass in different particles 14. Alternatively, a different magnetic i.d. for each particle 10 in a group of particles 10 can be produced by varying the number of implants 14 present within each particle 10. The implants 14 can have the same mass or can vary in mass. It should be pointed out that extremely heavy implants 14 (mass approaching 1 gram or greater) can overload the more sensitive GMR sensors used in the method and system of this invention described herein below, and therefore, should be used with caution.

Furthermore, a magnetic i.d. can be produced using a particular shape of implant 14 because of the signal produced by the shape when it is detected by the sensors described herein. Suitable shapes include, but are not limited to, cubical, rectangular or box-shaped, spherical, cylindrical, tetrahedron, circular, square, asterisk, cross, needle, coil, rectangular, triangular, and combinations thereof.

Continuing with reference to FIG. 1, detectable particle 10 also preferably includes a cargo component 16. Cargo component 16 optionally comprises an inoculum pack 18 of a suitable microorganism and its spores. When cargo component 16 includes an inoculum pack 18, the thermal conductivity of particle 10 must be lower than that of an actual food particle so as to provide a conservative characterization of the amount of heat received by the inoculum pack 18 when it is run through the flow. Inoculum pack 18 is designated by spaced dashes in FIG. 1.

After particle 10 is run through a thermal processing system, inoculum pack 18 can be used to determine the effectiveness of the system in killing microorganisms and to determine if particle 10 stayed in the system for a sufficient length of time at sufficient temperature to kill microorganisms and their spores. Thus, inoculum pack 18 is useful in evaluating thermal treatment of the stream of particulate-containing food product. Inoculum pack 18 can be cultured using well-known techniques, such as plating on a suitable culture medium, to see if microorganisms or their spores are present in sufficient numbers to grow when cultured.

Continuing with reference to FIG. 1, cargo component 16 further comprises thermal memory cells 20. Suitable examples of thermal memory cells 20 include those described in U.S. Pat. No. 5,159,564 and U.S. Pat. No. 5,021,981, the contents of each of which are herein incorporated by reference, as well as a time/temperature integrator cell. Thermal memory cells 20 are designated by rectangles with diagonal hatching in FIG. 1.

Thermal memory cells 20 are used to characterize the time-temperature profile of a thermal processing system. This enables the practitioner to determine if particles 10 were exposed to an appropriate temperature for an appropriate length of time as they passed through the system. Thus, thermal memory cells 20 are useful in evaluating thermal treatment of the stream of particulate-containing food product.

Cargo component 16 can include an inert material for density compensation, according to the density calculations described more fully below. Suitable examples of inert components include polypropylene beads, silica gel beads, non-magnetic stainless steel beads, a thermal insulating material and combinations thereof. Examples of suitable thermal insulating materials include polyurethane foam, among others. Thermal insulating materials are included to protect the magnetic implant 14 from the heat of the thermal processing system, as it is well-known that magnets are weakened by high temperature.

Additionally, the use of a thermal insulating material provides for a particle 10 with a thermal conductivity lower than that of an actual food particle so as to provide a conservative characterization of the amount of heat received by the inoculum pack 18 and thermal memory cells 20 when they are run through the flow in particle 10. Thus, other suitable examples of thermal insulating materials include polymers and polymer gels.

Cargo component 16 can also comprise an actual food product or can comprise a transponder such as one described in U.S. Pat. No. 5,261,282, issued to Grabowski et al. on Nov. 16, 1993, the contents of which are herein incorporated by reference. Cargo component 16 can also comprise a thermal pill, as described in *NASA Tech Briefs*, June 1990, p. 106.

Referring now to FIG. 2, carrier 12 comes in a variety of shapes. Each carrier 12 includes a lid 22 and a body 24. Lids 22 can be threadingly secured to body 24 via threads 26. Alternatively, lids 22 can be permanently secured to body 24. As an additional alternative, an adhesive layer 28 can be used to fixedly secure lid 22 to body 24. Adhesive layer 28 can optionally comprise an ultra-violet activated adhesive. Additionally, gaskets (not shown in FIG. 2) can be used to provide a better seal between lid 22 and body 24.

Figure 4:
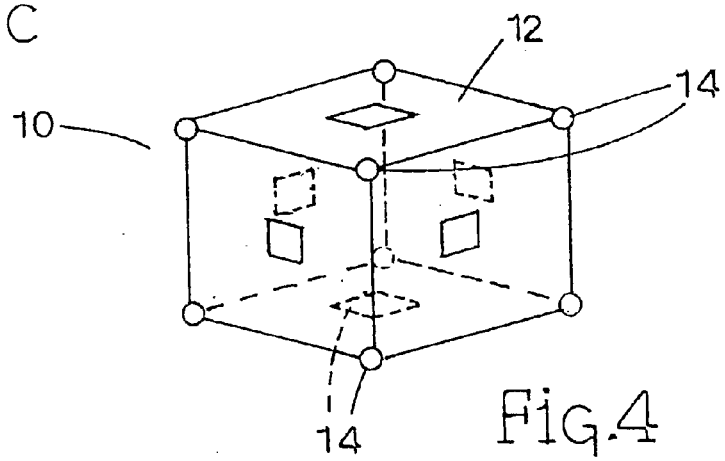
FIG. 4 is a perspective view of a cubical detectable particle of this invention wherein magnetic tracer elements are mounted at a plurality of locations around the particle.

Referring now to FIGS. 3 and 4, an alternative embodiment of particle 10 is described. The carrier component 12 of this embodiment of particle 10 comprises a solid mass, preferably comprising polypropylene or polystyrene. As best seen in FIG. 3, carrier components 12 are formed in a variety of shapes, including cubical, rectangular or box-shaped, spherical and cylindrical. Indeed, the shapes can be chosen to simulate food particle shapes either nearly exactly or conservatively. In this case, each carrier component 12 is also dimensioned according to actual food particle size specifications in order to facilitate conservative simulation of an actual food particle's behavior in a thermal flow.

In the embodiment depicted in FIGS. 3 and 4, detectable components 14 comprise magnetic implants. Referring now to FIG. 4, magnetic implants 14 are mounted using a suitable adhesive into bores drilled into carrier component 12. As best seen in FIG. 4, magnetic implants 14 are mounted at corners and/or at the centers of sides of the cubical carrier component 12. This approach provides for fourteen (14) placement points for implants 14. These placement points can be made more specific by placing similar implants at corresponding opposite locations. Stated differently, particle 10 can include seven (7) paired sets of implants 14. This particular configuration provides for potentially seven (7) different magnetic identifications. Thus, the term "magnetic identification" also includes the magnetic fields generated by combinations of multiple magnetic implants included within particle 10.

Figure 5:
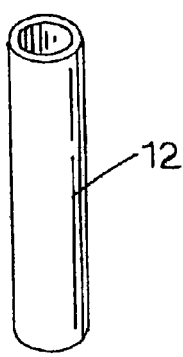
FIG. 5 is a perspective view of a carrier component of an alternative embodiment of the detectable particle of this invention.
Figure 6:
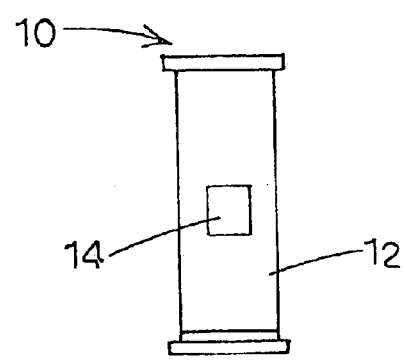
FIG. 6 is a front view of the detectable particle of this invention including the carrier component depicted in FIG. 5 and further including a detectable implant.

Referring now to FIGS. 5 and 6, another alternative embodiment of particle 10 is described. The carrier component 12 of this embodiment of particle 10 comprises a hollow tube, preferably comprising polypropylene or polystyrene. The tube can be of varying diameter, including ¼ of inch, ⅛ of inch and 1/16 of an inch. The appropriate length and diameter of the tube are chosen according to actual food particle size specifications in order to facilitate conservative simulation of an actual food particle's behavior in a thermal flow.

As best seen in FIG. 6, a detectable component 14 comprising a magnetic implant is placed into carrier component 12 and the ends of the carrier component 12 are sealed to form particle 10.

While the foregoing examples present examples of carrier 12 that comprise polypropylene and polystyrene, it is also noted that carrier 12 can comprise an actual food particle.
Determination of Density to be Used in Simulated Particle Density Compensation One of the most important particle properties affecting its behavior (especially velocity and the resulting residence time) in multi-phase flow during thermal processing of the particulate containing foods is density.

Before detectable particle 10 can be inserted into a thermal flow, the target density of the particle must be determined and the actual density of the particle must be adjusted to match the target density. The objective in the preferred embodiment is to provide a detectable particle with a density that provides a conservative residence time measurement as compared to the food particle (i.e., potato, beef cube, etc.) of interest, while containing a sufficient level of magnetic material loading to enable reliable entry and exit detection under realistic processing conditions. By "conservative residence time measurement", it is meant that residence time measurement with the highest likelihood of containing the fastest particle. Thus, in the preferred embodiment of the invention, when it is said that the density of the particle is compensated to a target level, it is meant that density which provides for a conservative residence time measurement.

The critical density of particle 10 is defined as the particle density range with the highest likelihood of containing the fastest particle, as determined experimentally for each system or system component. The critical density is dependent to an extent on fluid density, and not particle density. For the standard horizontal hold tubes often used in continuous thermal processing, the critical density is near to slightly lower than carrier fluid density. For other geometries of the standard continuous thermal processing equipment, such as scraped surface heat exchanger (SSHE) or helical tubes, the critical density is dependent on the geometry/inclination of the equipment.

Due to thermal, spatial and temporal variations of density caused by thermal expansion, denaturation of proteins, and release and transport of fats, liquids and gases it is very difficult to monitor or even estimate the density of particles during the process. It is additionally difficult to monitor the relationship of solid particle density to carrier fluid density in situ since all of the above variations at the same time affect the density and density dynamics of the carrier fluid. Thus, no specific density range or ratio can be eliminated from the range potentially occurring during the processing.

It is thus desirable to determine the velocities and residence times of a range of simulated particles with various densities, preferably including the initial particle density, the initial carrier fluid density, the final particle density, the final carrier fluid density and their maximal and minimal values achieved during processing determined either experimentally or theoretically; and a selected additional range above and below the minimum and maximum values thus obtained.

A simulated particle population is generated evenly covering the established range of densities by individual particle density adjustment using the carrier-implant-cargo calculation principles presented in Table 2 below.

The velocity/residence time measurements are then performed by inserting the particles with various densities into the product stream and measuring the entry and exit times at selected locations in the process.

The resulting range of velocities and residence times thus incorporates all the reasonably expected residence time variability dependent on particle density. The method is device and process independent, i.e., is applicable to any process geometry and operating conditions.

Figure 13:
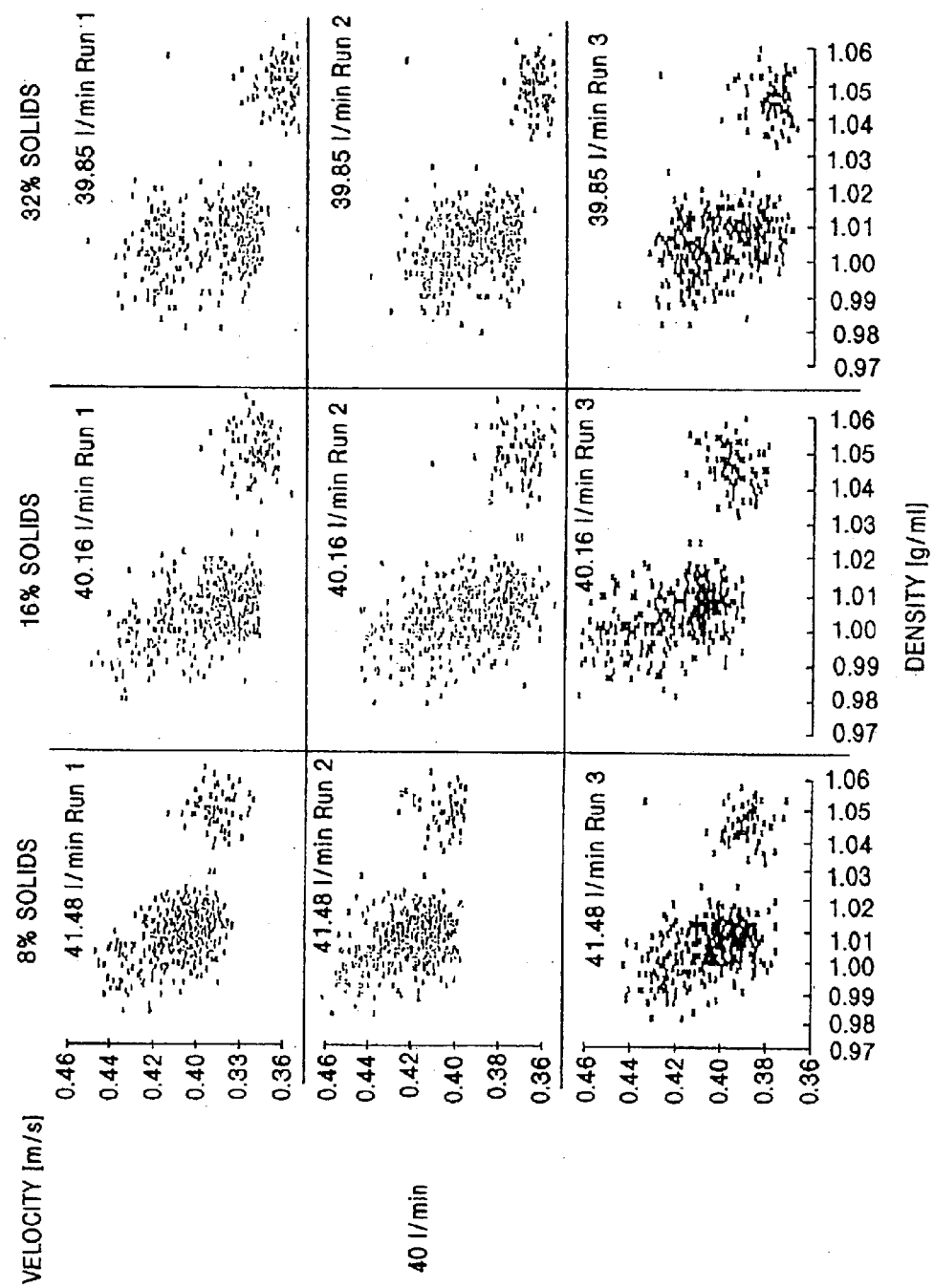
FIG. 13 is a graphical presentation of velocity versus density relationship at a 40 l/min flow rate.
Figure 14:
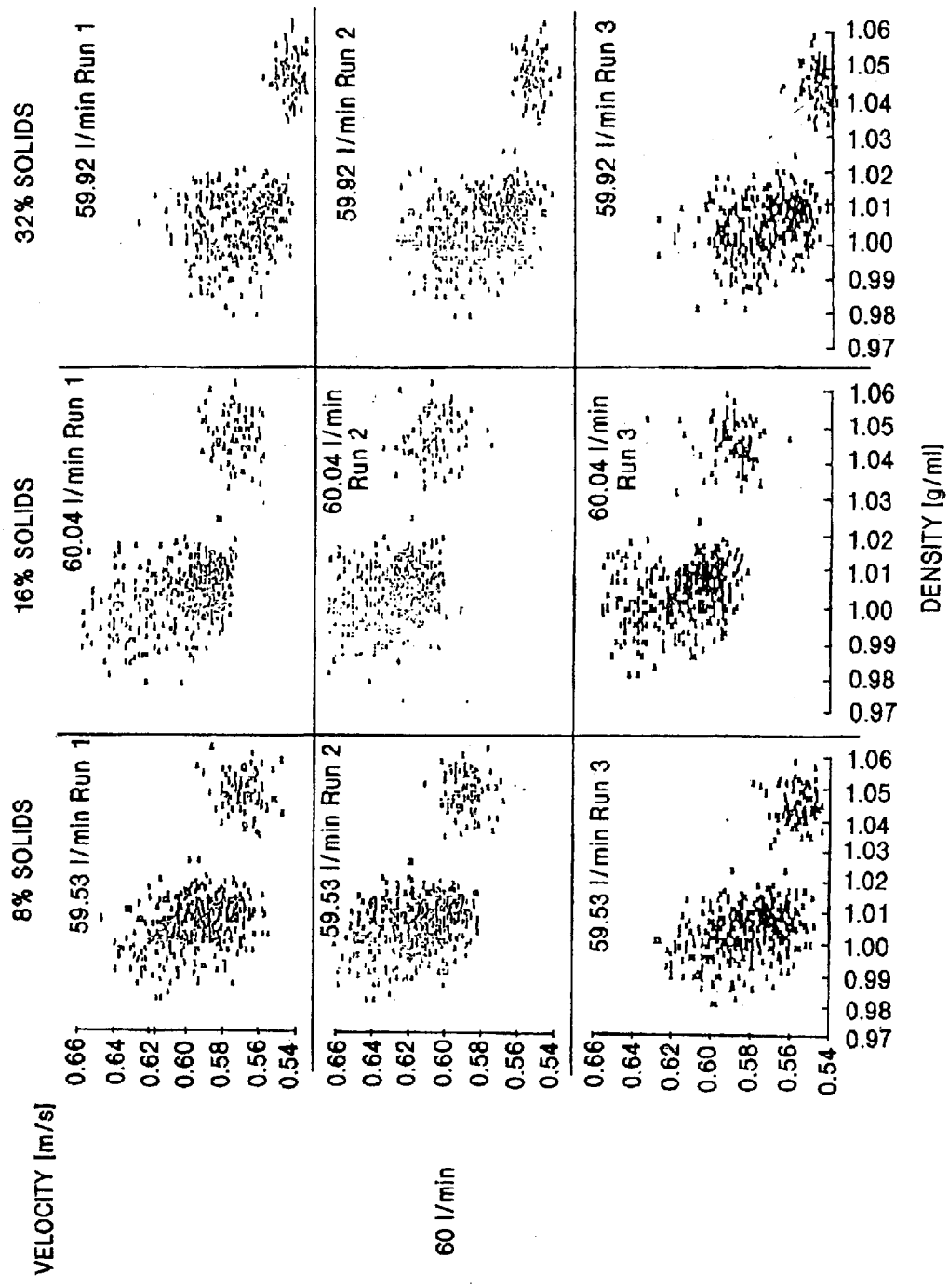
FIG. 14 is a graphical presentation of velocity versus density relationship at 60 l/min flow rate.
Figure 15:
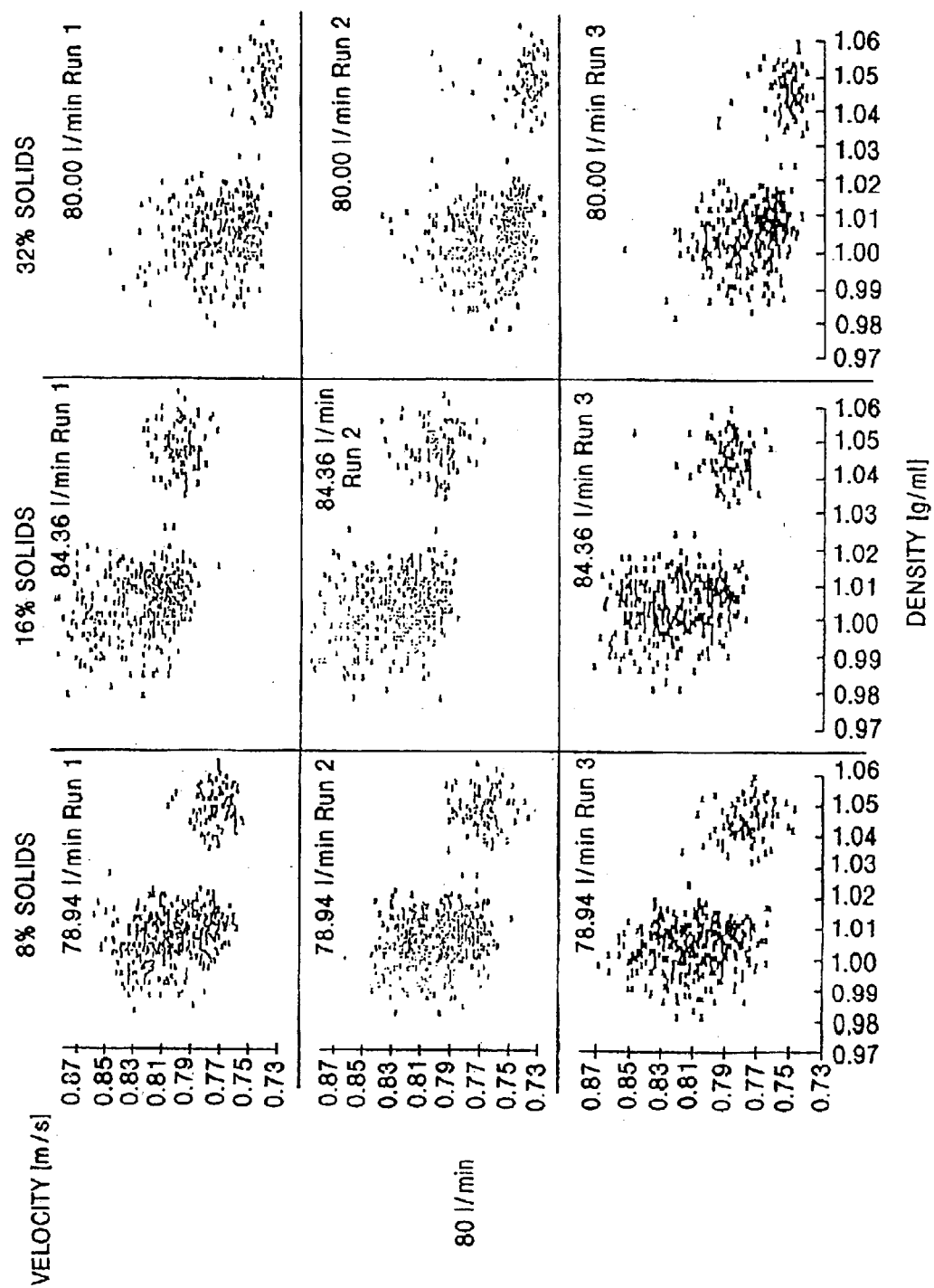
FIG. 15 is a graphical presentation of velocity versus density relationship at 80 l/min flow rate.
Figure 16:
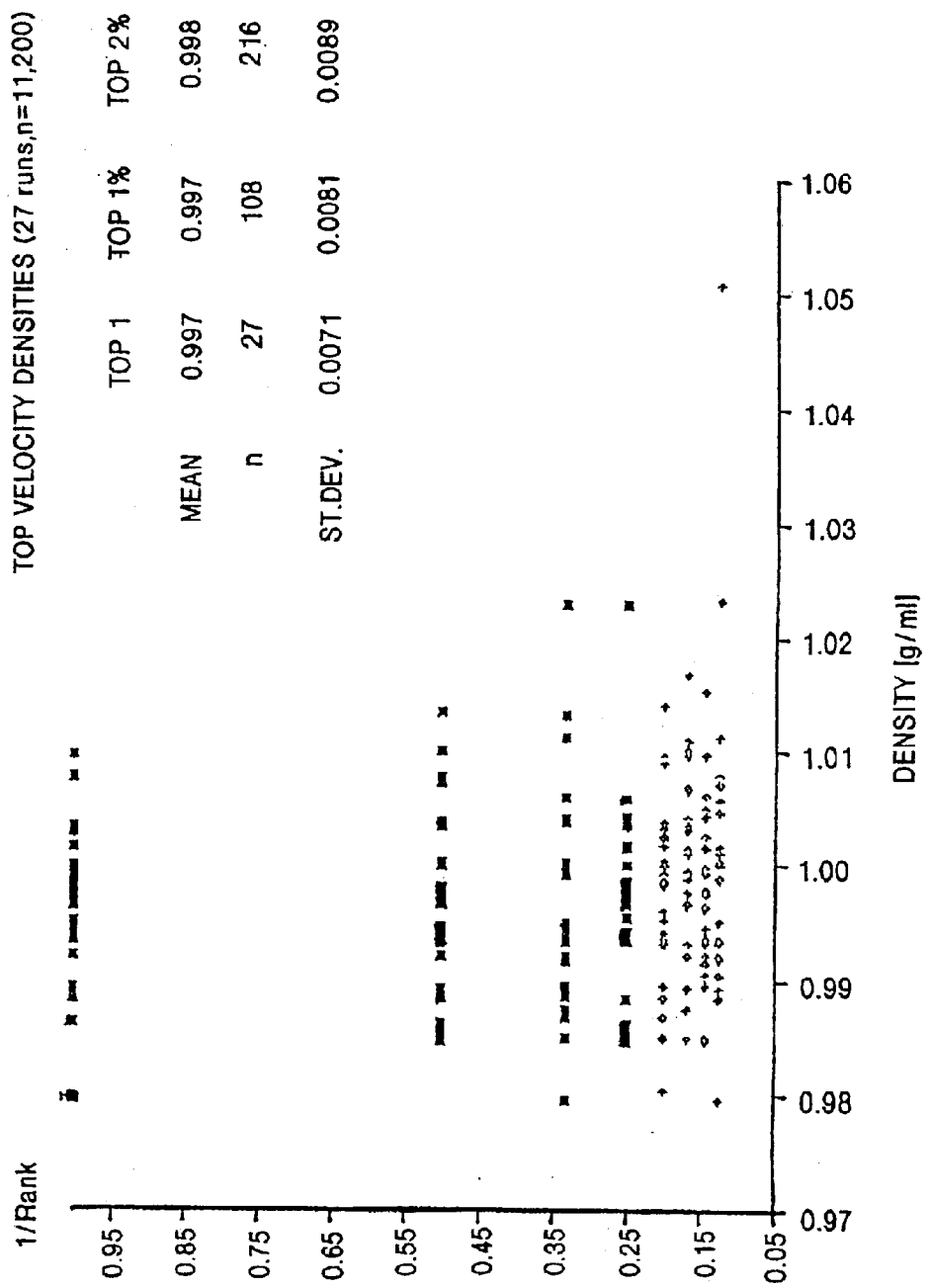
FIG. 16 is a graphical presentation of the critical density range determined from 27 experimental runs.

FIGS. 13 through 16 graphically present the results of critical density experiments. FIG. 13 is a graphical presentation of velocity versus density relationship at a 40 l/min flow rate. FIG. 14 is a graphical presentation of velocity versus density relationship at 60 l/min flow rate. FIG. 15 is a graphical presentation of velocity versus density relationship at 80 l/min flow rate. FIG. 16 is a graphical presentation of the critical density range determined from 27 experimental runs.

Critical density is therefore defined as the particle density value or density range with the highest likelihood of containing the fastest particle. In the preferred embodiment of the invention, the target density is defined as the arithmetic mean of the critical density range and can then be used as a basis for density compensation of simulated particles to be used for the residence time measurement so that the residence time measurement will be conservative.

The target density can be used to determine the mass of cargo component 16 to be included in carrier 12 for density compensation. First of all, total mass is calculated by multiplying target density times particle volume. Then, cargo mass is determined by subtracting from the total mass of the particle the container mass and the implant mass. This calculation is set forth in Table 2 below.

TABLE 2

Cargo mass calculation for density compensation:

Total mass = Target density * Particle volume
Cargo mass = Total mass − Container mass − Implant mass Minimum Insertion Delay Calculations for Particle Residence Time Measurement in Multi-Phase Flow During Thermal Food Processing Once the target density is determined and particle density is adjusted accordingly, the particle is ready for insertion into the flow of food to the characterized. The detectable particles are inserted into a food product flowing through a thermal system at pre-selected intervals. The insertion delay intervals are selected to maximize the number of inserted detectable particles per unit time and minimize the time and quantity of food product used for the required measurements. Although an insertion device can be used if desired, no special insertion device is needed. The first detectable particle can be simply inserted into a hopper that is in communication with the stream of food and the timing delay for the remaining particles, as presented in the Tables 2b through 2f below, can be started at the time of system entry detection.

An insertion device with controlled delay or feedback trigger that is calibrated to activate according to the interval delays described in Tables 2b through 2f below can also be used to control the insertion timing. Such a device is placed in communication with a continuous flow to accomplish insertion.

Another example of an insertion device can be found in U.S. Pat. No. 5,261,282, issued to Grabowski et al. on Nov. 16, 1993, the contents of which are herein incorporated by reference, as injection station 37.

The injection delay intervals are selected based on several assumptions:
 1. Several different particle magnetic identifications are used in the residence time measurement.
 2. Magnetic tagging via implants and detection via external, non-obstructing sensors are the preferred means of i.d. assignment and i.d. recognition respectively.
 3. The goal is to minimize the expenditure in product and time while enabling a high number of particle residence time measurements.

The standard methodology employing magnetically tagged particles requires that the exit of the previous particle be positively confirmed (each particle clears the entire system) before the next tagged particle is inserted to prevent misidentification.

In applicants' method, the calculation of the minimum insertion delay allows the insertion of the following particle before the previous particle has cleared the system by insuring that the delay is sufficient to avoid the meeting of identical i.d. particles. Stated differently, after inserting a particle having a magnetic i.d. 1, particle having magnetic i.d.s 2, 3, 4, etc. can be inserted into the flow one after another during the pre-selected interval before the next particle having magnetic i.d. 1 is inserted. Thus, the method and system of this invention provide for the presence of a plurality of detectable particles in the stream at one time.

The major principle of applicants' method is that two particles with identical magnetic i.d.s should never be allowed to get in contact or get ahead of one another at any point in the system. Thus, for the basic minimum insertion delay interval it is assumed that the theoretically fastest particle always follows the theoretically slowest particle in the system. The insertion delay interval is then calculated so that it is sufficient to prevent the theoretically fastest particle from ever catching up with the theoretically slowest particle (with the identical i.d.).

Tables 2a through 2f present calculations of minimum required delay time between successive particle injections for a range of operating conditions. All calculations are based on a 2 in. (5.08 cm) internal diameter hold tube.

Table 2a demonstrates the product usage and time needed to perform the residence time measurements by the standard methodology.

Table 2b illustrates the principle of calculated time delay interval using a single type of magnetic implant identification, establishing a required time delay needed to avoid the contact of two subsequent particles with the same magnetic identification.

Tables 2c, 2d, 2e and 2f illustrate the advantages (savings in time and product) when multiple (2, 3, 4, and 5 respectively) magnetic i.d.s are used for particle tagging. The insertion delay interval is thus divided by 2, 3, 4 and 5 respectively while maintaining the same minimum insertion delay between two particles having the same magnetic i.d.s.

Tables 2a through 2f describe three sets of runs at flow rates of 40, 60 and 80 liters per minute and in tubes of 40, 60 and 80 meters in length. Thus, each table includes nine (9) entries. Due to margin requirements and character size considerations, the tables have been assembled in segments below. Each line of data within each table begins with, or falls below, a number between 1 and 9 to correspond with each run. Thus, the table segments should be reviewed with this numbering system in mind.

TABLE 2a

PRODUCT USAGE AND TIME FOR PRIOR ART METHODS

| | Flow rates | | Avg. fluid velocity | Tube | Avg. time of flight | TIME AND PRODUCT NEEDED FOR ONE RUN (400 DETECTABLE PARTICLES) | | | TIME AND PRODUCT NEEDED FOR THREE RUNS (3 * 400 DETECTABLE PARTICLES) | |
|---|---|---|---|---|---|---|---|---|---|---|
| | [l/min] | [m³/s] | [m/s] | [m] | [s] | TIME [s] | TIME [h] | PRODUCT [l] | TIME [h] | PRODUCT [l] |
| 1. | 40 | 0.000667 | 0.32892 | 40 | 121.61 | 48643.92 | 13.5122 | 32429.27866 | 40.53659833 | 97287.83599 |
| 2. | 40 | 0.000667 | 0.32892 | 60 | 182.41 | 72965.88 | 20.2683 | 48643.91799 | 60.80489749 | 145931.754 |
| 3. | 40 | 0.000667 | 0.32892 | 80 | 243.22 | 97287.84 | 27.0244 | 64858.55732 | 81.07319666 | 194575.672 |
| 4. | 60 | 0.001 | 0.49338 | 40 | 81.073 | 32429.28 | 9.008133 | 32429.27866 | 27.02439889 | 97287.83599 |
| 5. | 60 | 0.001 | 0.49338 | 60 | 121.61 | 48643.92 | 13.5122 | 48643.91799 | 40.53659833 | 145931.754 |
| 6. | 60 | 0.001 | 0.49338 | 80 | 162.15 | 64858.56 | 18.01627 | 64858.55732 | 54.04879777 | 194575.672 |
| 7. | 80 | 0.001333 | 0.65784 | 40 | 60.805 | 24321.96 | 6.7561 | 32429.27866 | 20.26829916 | 97287.83599 |
| 8. | 80 | 0.001333 | 0.65784 | 60 | 91.207 | 36482.94 | 10.13415 | 48643.91799 | 30.40244875 | 145931.754 |
| 9. | 80 | 0.001333 | 0.65784 | 80 | 121.61 | 48643.92 | 13.5122 | 64858.55732 | 40.53659833 | 194575.672 |

TABLE 2b

PROGRAMMED INSERTION DELAY (SINGLE MAGNETIC PARTICLE TYPE)

| | Flow rates | | Avg. fluid velocity | Tube | MAXIMUM THEORETICAL DETECTABLE PARTICLE VEL. (avg. fluid *2) | Time of flight | MINIMUM THEORETICAL DETECTABLE PARTICLE VEL. (avg. fluid vel.) | Time of flight [s] | MINIMUM DELAY |
|---|---|---|---|---|---|---|---|---|---|
| | [l/min] | [m³/s] | [m/s] | [m] | [m/s] | [s] | [m/s] | | [s] |
| 1. | 40 | 0.000667 | 0.32892 | 40 | 0.6578 | 60.80 | 0.32892 | 121.61 | 60.80 |
| 2. | 40 | 0.000667 | 0.32892 | 60 | 0.6578 | 91.21 | 0.32892 | 182.41 | 91.21 |
| 3. | 40 | 0.000667 | 0.32892 | 80 | 0.6578 | 121.61 | 0.32892 | 243.22 | 121.61 |
| 4. | 60 | 0.001 | 0.49338 | 40 | 0.9868 | 40.54 | 0.49338 | 81.07 | 40.54 |
| 5. | 60 | 0.001 | 0.49338 | 60 | 0.9868 | 60.80 | 0.49338 | 121.61 | 60.80 |
| 6. | 60 | 0.001 | 0.49338 | 80 | 0.9868 | 81.07 | 0.49338 | 162.15 | 81.07 |
| 7. | 80 | 0.001333 | 0.65784 | 40 | 1.3157 | 30.40 | 0.65784 | 60.80 | 30.40 |
| 8. | 80 | 0.001333 | 0.65784 | 60 | 1.3157 | 45.60 | 0.65784 | 91.21 | 45.60 |
| 9. | 80 | 0.001333 | 0.65784 | 80 | 1.3157 | 60.80 | 0.65784 | 121.61 | 60.80 |

| | TIME AND PRODUCT NEEDED FOR ONE RUN (400 DETECTABLE PARTICLES) | | | TIME AND PRODUCT NEEDED FOR THREE RUNS (3 * 400 DETECTABLE PARTICLES) | |
|---|---|---|---|---|---|
| | TIME [s] | TIME [hr] | PRODUCT [l] | TIME [hr] | PRODUCT [l] |
| 1. | 24321.96 | 6.7561 | 16214.63933 | 20.26829916 | 48643.91799 |
| 2. | 36482.94 | 10.13415 | 24321.959 | 30.40244875 | 72965.87699 |
| 3. | 48643.92 | 13.5122 | 32429.27866 | 40.53659833 | 97287.83599 |
| 4. | 16214.64 | 4.504066 | 16214.63933 | 13.51219944 | 48643.91799 |
| 5. | 24321.96 | 6.7561 | 24321.959 | 20.26829916 | 72965.87699 |
| 6. | 32429.28 | 9.008133 | 32429.27866 | 27.02439889 | 97287.83599 |
| 7. | 12160.98 | 3.37805 | 16214.63933 | 10.13414958 | 48643.91799 |
| 8. | 18241.47 | 5.067075 | 24321.959 | 15.20122437 | 72965.87699 |
| 9. | 24321.96 | 6.7561 | 32429.27866 | 20.26829916 | 97287.83599 |

TABLE 2c

PROGRAMMED INSERTION DELAY (2 MAGNETIC PARTICLE I.D.s)

| | Flow rates | | Avg. fluid velocity | Tube | MAXIMUM THEORETICAL DETECTABLE PARTICLE VEL. (avg. fluid *2) | | MINIMUM THEORETICAL DETECTABLE PARTICLE VEL. (avg. fluid vel.) | | MINIMUM DELAY |
|---|---|---|---|---|---|---|---|---|---|
| | [l/min] | [m³/s] | [m/s] | [m] | [m/s] | Time of Flight [s] | [m/s] | Time of flight [s] | [s] |
| 1. | 40 | 0.000667 | 0.32892 | 40 | 0.6578 | 60.80 | 0.32892 | 121.61 | 60.80 |
| 2. | 40 | 0.000667 | 0.32892 | 60 | 0.6578 | 91.21 | 0.32892 | 182.41 | 91.21 |
| 3. | 40 | 0.000667 | 0.32892 | 80 | 0.6578 | 121.61 | 0.32892 | 243.22 | 121.61 |
| 4. | 60 | 0.001 | 0.49338 | 40 | 0.9868 | 40.54 | 0.49338 | 81.07 | 40.54 |
| 5. | 60 | 0.001 | 0.49338 | 60 | 0.9868 | 60.80 | 0.49338 | 121.61 | 60.80 |
| 6. | 60 | 0.001 | 0.49338 | 80 | 0.9868 | 81.07 | 0.49338 | 162.15 | 81.07 |
| 7. | 80 | 0.001333 | 0.65784 | 40 | 1.3157 | 30.40 | 0.65784 | 60.80 | 30.40 |
| 8. | 80 | 0.001333 | 0.65784 | 60 | 1.3157 | 45.60 | 0.65784 | 91.21 | 45.60 |
| 9. | 80 | 0.001333 | 0.65784 | 80 | 1.3157 | 60.80 | 0.65784 | 121.61 | 60.80 |

| | MINIMUM DELAY/2 [s] | TIME AND PRODUCT NEEDED FOR ONE RUN (400 DETECTABLE PARTICLES) | | | TIME AND PRODUCT NEEDED FOR THREE RUNS (3 * 400 DETECTABLE PARTICLES) | |
|---|---|---|---|---|---|---|
| | | TIME [s] | TIME [h] | PRODUCT [l] | TIME [hr] | PRODUCT [l] |
| 1. | 30.40 | 12160.98 | 3.37805 | 8107.319666 | 10.13414958 | 24321.959 |
| 2. | 45.60 | 18241.47 | 5.067075 | 12160.9795 | 15.20122437 | 36482.9385 |
| 3. | 60.80 | 24321.96 | 6.7561 | 16214.63933 | 20.26829916 | 48643.91799 |
| 4. | 20.27 | 8107.32 | 2.252033 | 8107.319666 | 6.756099721 | 24321.959 |
| 5. | 30.40 | 12160.98 | 3.37805 | 12160.9795 | 10.13414958 | 36482.9385 |
| 6. | 40.54 | 16214.64 | 4.504066 | 16214.63933 | 13.51219944 | 48643.91799 |
| 7. | 15.20 | 6080.49 | 1.689025 | 8107.319666 | 5.067074791 | 24321.959 |
| 8. | 22.80 | 9120.73 | 2.533537 | 12160.9795 | 7.600612186 | 36482.9385 |
| 9. | 30.40 | 12160.98 | 3.37805 | 16214.63933 | 10.13414958 | 48643.91799 |

TABLE 2d

PROGRAMMED INSERTION DELAY (3 MAGNETIC PARTICLE I.D.s)

| | Flow rates | | Avg. fluid velocity | Tube | MAXIMUM THEORETICAL DETECTABLE PARTICLE VEL. (avg. fluid *2) | | MINIMUM THEORETICAL DETECTABLE PARTICLE VEL. (avg. fluid vel.) | Time of flight | MINIMUM DELAY | MINIMUM DELAY/3 |
|---|---|---|---|---|---|---|---|---|---|---|
| | [l/min] | [m³/s] | [m/s] | [m] | [m/s] | Time of flight [s] | [m/s] | [s] | [s] | [s] |
| 1. | 40 | 0.000667 | 0.32892 | 40 | 0.6578 | 60.80 | 0.32892 | 121.61 | 60.80 | 20.27 |
| 2. | 40 | 0.000667 | 0.32892 | 60 | 0.6578 | 91.21 | 0.32892 | 182.41 | 91.21 | 30.40 |
| 3. | 40 | 0.000667 | 0.32892 | 80 | 0.6578 | 121.61 | 0.32892 | 243.22 | 121.61 | 40.54 |
| 4. | 60 | 0.001 | 0.49338 | 40 | 0.9868 | 40.54 | 0.49338 | 81.07 | 40.54 | 13.51 |
| 5. | 60 | 0.001 | 0.49338 | 60 | 0.9868 | 60.80 | 0.49338 | 121.61 | 60.80 | 20.27 |
| 6. | 60 | 0.001 | 0.49338 | 80 | 0.9868 | 81.07 | 0.49338 | 162.15 | 81.07 | 27.02 |
| 7. | 80 | 0.001333 | 0.65784 | 40 | 1.3157 | 30.40 | 0.65784 | 60.80 | 30.40 | 10.13 |
| 8. | 80 | 0.001333 | 0.65784 | 60 | 1.3157 | 45.60 | 0.65784 | 91.21 | 45.60 | 15.20 |
| 9. | 80 | 0.001333 | 0.65784 | 80 | 1.3157 | 60.80 | 0.65784 | 121.61 | 60.80 | 20.27 |

| | TIME AND PRODUCT NEEDED FOR ONE RUN (400 DETECTABLE PARTICLES) | | | TIME AND PRODUCT NEEDED FOR THREE RUNS (3 * 400 DETECTABLE PARTICLES) | |
|---|---|---|---|---|---|
| | TIME [s] | TIME [hr] | PRODUCT [l] | TIME [hr] | PRODUCT [l] |
| 1. | 8107.32 | 2.252033 | 5404.879777 | 6.756099721 | 16214.63933 |
| 2. | 12160.98 | 3.37805 | 8107.319666 | 10.13414958 | 24321.959 |
| 3. | 16214.64 | 4.504066 | 10809.75955 | 13.51219944 | 32429.27866 |
| 4. | 5404.88 | 1.501355 | 5404.879777 | 4.504066481 | 16214.63933 |

TABLE 2d-continued

PROGRAMMED INSERTION DELAY (3 MAGNETIC PARTICLE I.D.s)

| | | | | | |
|---|---|---|---|---|---|
| 5. | 8107.32 | 2.252033 | 8107.319666 | 6.756099721 | 24321.959 |
| 6. | 10809.76 | 3.002711 | 10809.75955 | 9.008132962 | 32429.27866 |
| 7. | 4053.66 | 1.126017 | 5404.879777 | 3.378049861 | 16214.63933 |
| 8. | 6080.49 | 1.689025 | 8107.319666 | 5.06707471 | 24321.959 |
| 9. | 8107.32 | 2.252033 | 10809.75955 | 6.756099721 | 32429.27866 |

TABLE 2e

PROGRAMMED INSERTION DELAY (4 MAGNETIC PARTICLE I.D.s)

| | Flow rates | | Avg. fluid velocity | Tube | MAXIMUM THEORETICAL DETECTABLE PARTICLE VEL. (avg. fluid *2) | | MINIMUM THEORETICAL DETECTABLE PARTICLE VEL. (avg. fluid vel.) | | MINIMUM DELAY | MINIMUM DELAY/4 |
|---|---|---|---|---|---|---|---|---|---|---|
| | | | | | | Time of flight | | Time of flight | | |
| | [l/min] | [m³/s] | [m/s] | [m] | [m/s] | [s] | [m/s] | [s] | [s] | [s] |
| 1. | 40 | 0.000667 | 0.32892 | 40 | 0.6578 | 60.80 | 0.32892 | 121.61 | 60.80 | 15.20 |
| 2. | 40 | 0.000667 | 0.32892 | 60 | 0.6578 | 91.21 | 0.32892 | 182.41 | 91.21 | 22.80 |
| 3. | 40 | 0.000667 | 0.32892 | 80 | 0.6578 | 121.61 | 0.32892 | 243.22 | 121.61 | 30.40 |
| 4. | 60 | 0.001 | 0.49338 | 40 | 0.9868 | 40.54 | 0.49338 | 81.07 | 40.54 | 10.13 |
| 5. | 60 | 0.001 | 0.49338 | 60 | 0.9868 | 60.80 | 0.49338 | 121.61 | 60.80 | 15.20 |
| 6. | 60 | 0.001 | 0.49338 | 80 | 0.9868 | 81.07 | 0.49338 | 162.15 | 81.07 | 20.27 |
| 7. | 80 | 0.001333 | 0.65784 | 40 | 1.3157 | 30.40 | 0.65784 | 60.80 | 30.40 | 7.60 |
| 8. | 80 | 0.001333 | 0.65784 | 60 | 1.3157 | 45.60 | 0.65784 | 91.21 | 45.60 | 11.40 |
| 9. | 80 | 0.001333 | 0.65784 | 80 | 1.3157 | 60.80 | 0.65784 | 121.61 | 60.80 | 15.20 |

| | TIME AND PRODUCT NEEDED FOR ONE RUN (400 DETECTABLE PARTICLES) | | | TIME AND PRODUCT NEEDED FOR THREE RUNS (3 * 400 DETECTABLE PARTICLES) | |
|---|---|---|---|---|---|
| | TIME [s] | TIME [hr] | [l] | TIME [hr] | PRODUCT [l] |
| 1. | 6080.49 | 1.689025 | 4053.659833 | 5.067074791 | 12160.9795 |
| 2. | 9120.73 | 2.533537 | 6080.489749 | 7.600612186 | 18241.46925 |
| 3. | 12160.98 | 3.37805 | 8107.319666 | 10.13414958 | 24321.959 |
| 4. | 4053.66 | 1.126017 | 4053.659833 | 3.378049861 | 12160.9795 |
| 5. | 6080.49 | 1.689025 | 6080.489749 | 5.067074791 | 18241.46925 |
| 6. | 8107.32 | 2.252033 | 8107.319666 | 6.756099721 | 24321.959 |
| 7. | 3040.24 | 0.844512 | 4053.659833 | 2.533537395 | 12160.9795 |
| 8. | 4560.37 | 1.266769 | 6080.489749 | 3.800306093 | 18241.46925 |
| 9. | 6080.49 | 1.689025 | 8107.319666 | 5.067074791 | 24321.959 |

TABLE 2f

PROGRAMMED INSERTION DELAY (5 MAGNETIC PARTICLE I.D.s)

| | Flow rates | | Avg. fluid velocity | Tube | MAXIMUM THEORETICAL DETECTABLE PARTICLE VEL. (avg. fluid *2) | | MINIMUM THEORETICAL DETECTABLE PARTICLE VEL. (avg. fluid *2) | | MINIMUM DELAY |
|---|---|---|---|---|---|---|---|---|---|
| | | | | | | Time of flight | | Time of flight | |
| | [l/min] | [m³/s] | [m/s] | [m] | [m/s] | [s] | [m/s] | [s] | [s] |
| 1. | 40 | 0.000667 | 0.32892 | 40 | 0.6578 | 60.80 | 0.32892 | 121.61 | 60.80 |
| 2. | 40 | 0.000667 | 0.32892 | 60 | 0.6578 | 91.21 | 0.32892 | 182.41 | 91.21 |
| 3. | 40 | 0.000667 | 0.32892 | 80 | 0.6578 | 121.61 | 0.32892 | 243.22 | 121.61 |
| 4. | 60 | 0.001 | 0.49338 | 40 | 0.9868 | 40.54 | 0.49338 | 81.07 | 40.54 |
| 5. | 60 | 0.001 | 0.49338 | 60 | 0.9868 | 60.80 | 0.49338 | 121.61 | 60.80 |
| 6. | 60 | 0.001 | 0.49338 | 80 | 0.9868 | 81.07 | 0.49338 | 162.15 | 81.07 |

TABLE 2f-continued

PROGRAMMED INSERTION DELAY (5 MAGNETIC PARTICLE I.D.s)

| | | | | | | | | | |
|---|---|---|---|---|---|---|---|---|---|
| 7. | 80 | 0.001333 | 0.65784 | 40 | 1.3157 | 30.40 | 0.65784 | 60.80 | 30.40 |
| 8. | 80 | 0.001333 | 0.65784 | 60 | 1.3157 | 45.60 | 0.65784 | 91.21 | 45.60 |
| 9. | 80 | 0.001333 | 0.65784 | 80 | 1.3157 | 60.80 | 0.65784 | 121.61 | 60.80 |

| | MINIMUM | TIME AND PRODUCT NEEDED FOR ONE RUN (400 DETECTABLE PARTICLES) | | TIME AND PRODUCT NEEDED FOR THREE RUNS (3 * 400 DETECTABLE PARTICLES) | |
|---|---|---|---|---|---|
| | DELAY/5 [s] | TIME [s] | TIME [hr] | PRODUCT [l] | TIME [hr] | PRODUCT [l] |
| 1. | 12.16 | 4864.39 | 1.35122 | 3242.927866 | 4.053659833 | 9728.783599 |
| 2. | 18.24 | 7296.59 | 2.02683 | 4864.391799 | 6.080489749 | 14593.1754 |
| 3. | 24.32 | 9728.78 | 2.70244 | 6485.855732 | 8.107319666 | 19457.5672 |
| 4. | 8.11 | 3242.93 | 0.900813 | 3242.927866 | 2.702439889 | 9728.783599 |
| 5. | 12.16 | 4864.39 | 1.35122 | 4864.391799 | 4.053659833 | 14593.1754 |
| 6. | 16.21 | 6485.86 | 1.801627 | 6485.855732 | 5.404879777 | 19457.5672 |
| 7. | 6.08 | 2432.20 | 0.67561 | 3242.927866 | 2.026829916 | 9728.783599 |
| 8. | 9.12 | 3648.29 | 1.013415 | 4864.391799 | 3.040244875 | 14593.1754 |
| 9. | 12.16 | 4864.39 | 1.35122 | 6485.855732 | 4.053659833 | 19457.5672 |

Detection and Identification of Particles in a Continuous Thermal Process

Detection and identification of particles 10 can be accomplished by using a variety of magnetic sensors. A copper coil sensor is one suitable example. Copper coil sensors have medium sensitivity and are based on magnetic flux change. A minimum particle velocity is required for detection.

Hall effect sensors are also acceptable, as the sensors are medium/high sensitivity and can detect changes in magnetic flux under temperature conditions up to 110° C.

However, the preferred magnetic sensor relies on the giant magneto-resistive (GMR) phenomenon. This effect is found in metallic thin films comprising magnetic layers a few nanometers thick separated by equally thin non-magnetic layers. A large decrease in the resistance of these films is observed when a magnetic field is applied. Thus, magnetic sensors including GMR materials can be used to detect the magnetic fields present in the detectable particles.

The GMR sensor is very sensitive and can operate at temperatures ranging up to at least 150° C. It is also inexpensive and very small. A graph of GMR sensor output characteristics is set forth in FIG. 11. See GMR Sensor Application Notes, available from Nonvolatile Electronics, Incorporated (NVE), 11409 Valley View Road, Eden Prairie, Minn. 55344-3617.

Single or multiple magnetic sensors are located at detection points downstream from the detection location. Time of passage is determined for each tagged particle from the detector response at each location. The outputs from magnetic sensors are used in combination with magnetic implant configuration and insertion delay time to identify each inserted particle within a sequence of single or multiple magnetic identification configurations. Using multiple magnetic identifications, time and product quantity required for the three replicants of 400 particle residence measurement can be reduced by 90% or more.

The method and system of this invention can be used with a variety of processing configurations and under a variety of process parameter settings. It is particularly appropriate for systems including tube-type heat exchangers (helical heat exchangers, ribbed tube heat exchangers, etc.) but can be used with any existing processing equipment.

Figure 7:
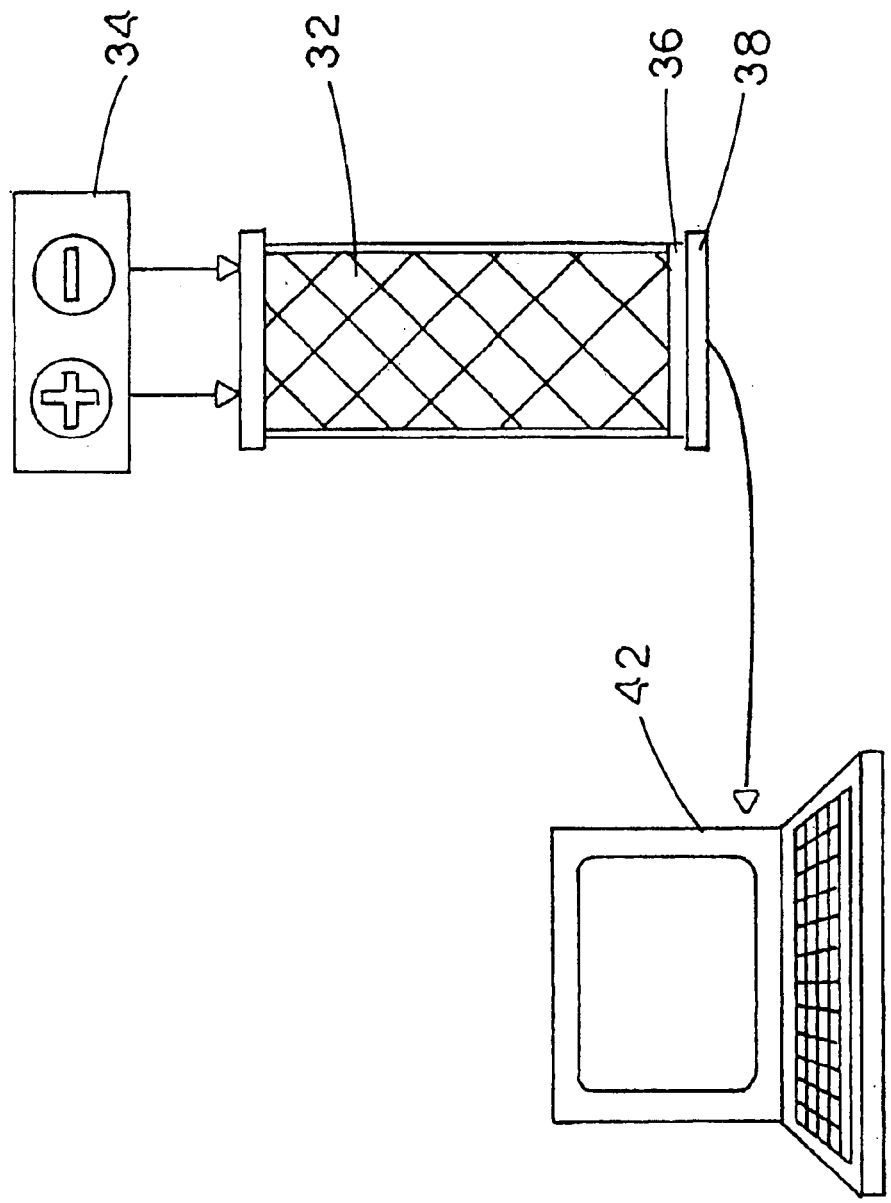
FIG. 7 is a schematic view of the system of this invention.
Figure 9A:
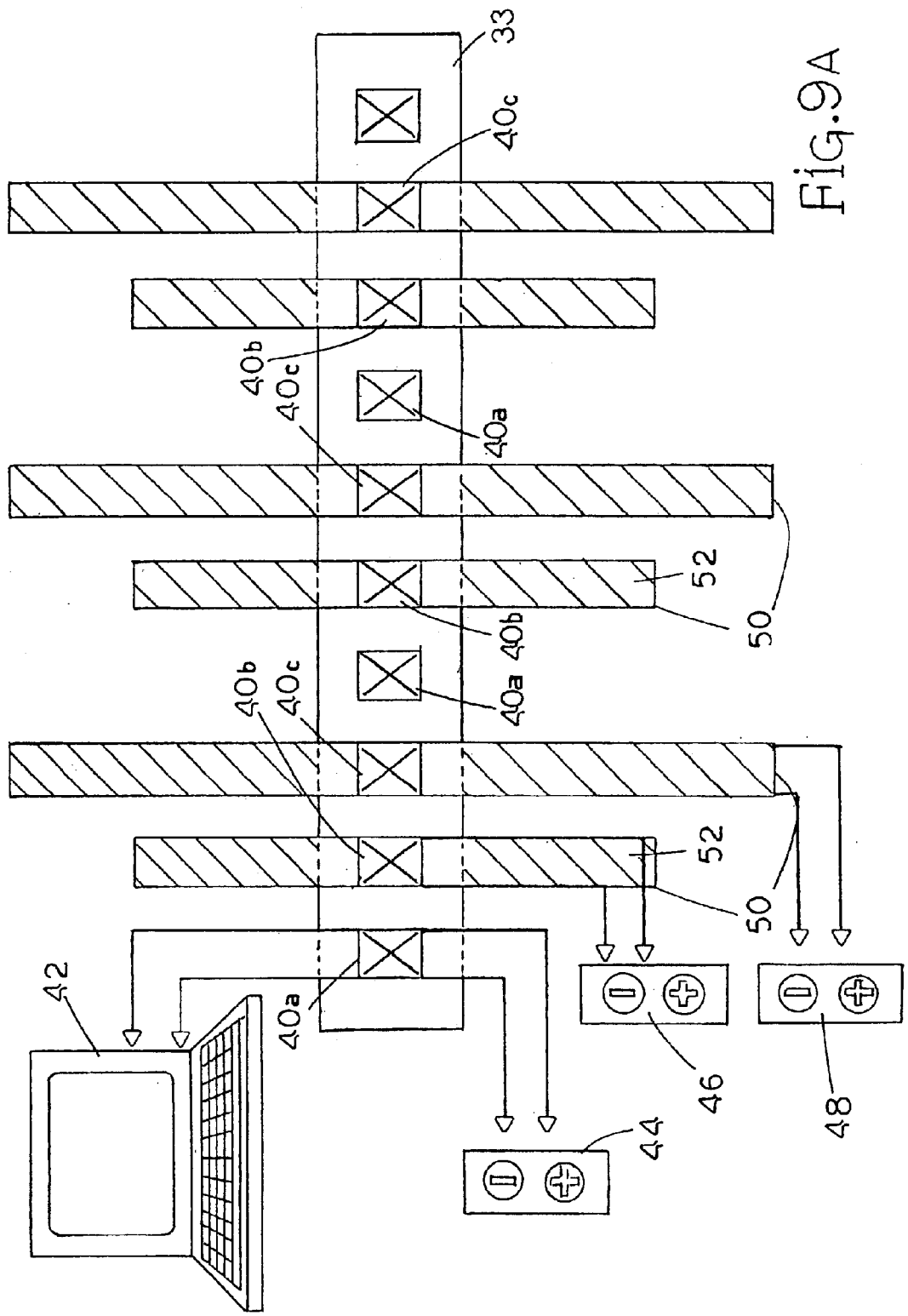
FIG. 9A is a schematic of a first alternative embodiment of the system of this invention prior to mounting on a thermal processing apparatus.
Figure 9B:
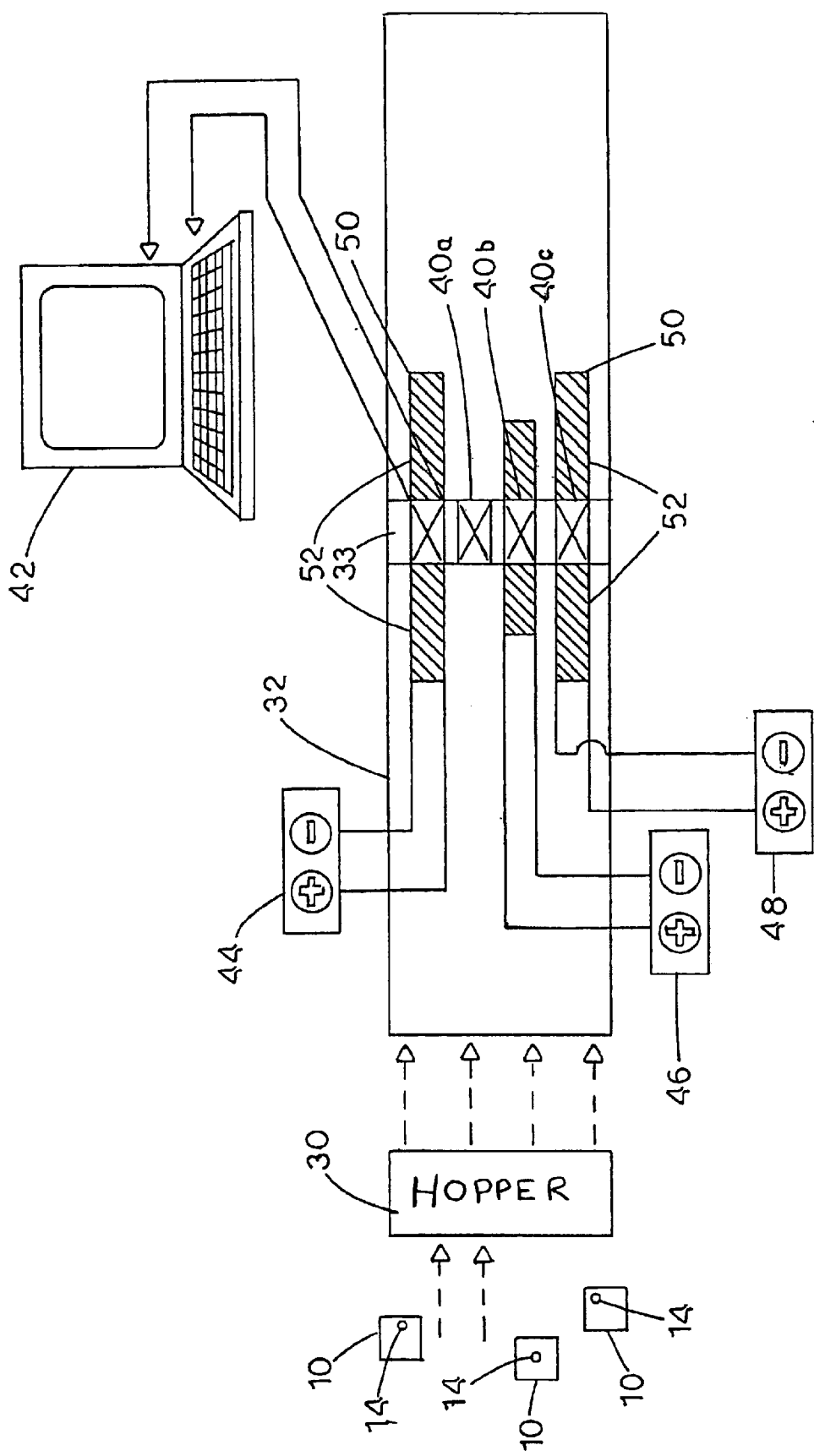
FIG. 9B is a schematic of a first alternative embodiment of the system of this invention when mounted on a thermal processing apparatus.

Referring now to FIGS. 7 and 8, a preferred sensor configuration is described. A segment 32 of pipe suitable for use in a continuous thermal processing apparatus is fitted with a gasket 36 at coupling 38. Preferably, pipe 32 comprises sanitary stainless steel. A continuous thermal processing apparatus is described in U.S. Pat. No. 5,261,282, issued to Grabowski et al. on Nov. 16, 1993, the contents of which are herein incorporated by reference. Such an apparatus typically includes one or more heating tubes, one or more holding tubes, and one or more cooling tubes, as well as suitable components to package the product after heat treatment. It is contemplated then that pipe 32 can be included as a section within any length of heating, holding or cooling tube. Moreover, as FIG. 7 is schematic, it is also contemplated that pipe 32 represents all three sections, heating, holding and cooling, of a standard apparatus.

Gasket 36 comprises a material suitable for use in a continuous thermal processing apparatus. As described herein, gasket 36 includes sensors 40. A battery 34, or other appropriate DC power source, is operatively connected to sensors 40 to provide appropriate input voltages.

Gasket 36 is preferably in contact with the flow. The sensitivity of detection sensors 40, here GMR sensors, is enhanced by their placement within gasket 36. A preferred sensor 40 is available as Part Number AA002-02 (previously Part Number NVSSB15S) from Nonvolatile Electronics, Incorporated (NVE), 11409 Valley View Road, Eden Prairie, Minn. 55344-3617. This sensor is capable of detecting a magnetic field at least as low as 0.05 oersteds. Further, this sensor can detect a magnetic field ranging in strength from at least as low as 0.05 oersteds to about 20 oersteds.

As best seen in FIG. 8, sensors 40 are disposed around the inner periphery of gasket 3G, thus placing them proximate to the flow of food without placing an obstruction within the flow. This configuration eliminates the need to sense through the wall of stainless steel pipe 32 (see FIG. 7).

A computer acquisition system 42 including appropriate software is used to monitor and register signals originating at each sensor 40. This output is used for timing and identification on-line and for post process analyses. Computer acquisition system 42 preferably comprises a PENTIUM® microprocessor personal computer (PC) including a Keithley Metrobyte DAS1800HC package with TESTPOINT™ software. TESTPOINT™ software is a commercially available package that can receive sensor signals, process them and output the signals in a suitable form, such as graphically. TESTPOINT™ software is designed to be programmable so that the user can customize it according to the user's needs.

Embodiment of System Including Sensors Calibrated to Magnetic I.D. Ranges of Particles Referring now to FIGS. 9A and 9B, an alternative configuration for sensors 40 in the method and system of this invention is depicted. GMR sensors 40a, 40b and 40c are wrapped around pipe 32 using belt 33 at test point locations. Belt 33 can be tied on, clipped on, or strapped on using a hook-and-eye type closure sold under the registered trademark VELCRO®. Flexible printed circuits, which are commercially available, can also be used to mount sensors 40.

In this embodiment, particles 10 are inserted via an insertion means like hopper 30. GMR sensors 40a, 40b and 40c are connected to batteries (or other appropriate DC power sources) 44, 46 and 48, respectively, that provide different input voltages so that input voltages that alternate between adjacent sensors are provided. GMR sensors 40a, 40b and 40c are also mounted in straps 50 that include flux concentrating material 52 so that alternating sensors pick up different magnetic field strengths. Thus, the alternating input voltage and/or flux concentrator strengths can be adjusted to magnetic identifications comprising individual magnetic field strengths for particles 10 introduced into a continuous thermal processing system. Thus, the term "magnetic identifications" also comprises individual magnetic field strengths for particles 10. Signals from the now customized sensors 40a, 40b and 40c are transmitted to computer acquisition system 42 for processing.

The magnetic I.D. tagging and detection system employs the following components:

Particles 10:

Multiple different magnetic I.D.s are achieved by implanting individual magnetic implants 14 of different sizes and magnetic field strengths at different positions within the particle 10. Thus, a variety of magnetic field strengths and orientations can be assigned to particles having identical shape, size and density.

Sensors 40a, 40b and 40c:

Sensors 40a, 40b and 40c are positioned around the pipe 32 containing the flowing product stream. The sensors 40a, 40b and 40c are arranged in sets of 3 equally sensitive sensors positioned equidistantly around the pipe perimeter.

The sensitivity of sensors 40a, 40b and 40c is controlled by two methods (and their combinations):

1. Varying lengths of soft iron (or other magnetically permeable material) magnetic flux concentrating material 52 extend within straps 50 from sensor edges. The longer the length of the flux concentrating material 52, the more sensitive the sensor 40 to the magnetic field presence. The sensors 40 that need no sensitivity-enhancement are left without flux concentrating material 52.

2. Varying the driving voltage from batteries (or other appropriate DC power sources) 44, 46 and 48 of each sensor group—since the output signal (voltage out) is dependent both on the input signal (voltage in) and the reduction of the sensor resistance caused by the magnetic field; the higher the input voltage, the higher the output voltage signal, i.e., more sensitive the sensor 40.

Both flux concentrator dimensions and the driving voltages of individual sensor clusters are adjusted so that clear detection and differentiation is achieved between the individual magnetically tagged particle i.d.s. The exact dimensions of the flux concentrating material 52 and the values of input voltages from batteries (or other appropriate DC power sources) 44, 46 and 48 are adjusted depending on the number and type of tag i.d.s, but range from 3–10 inches and from 1.5 to 48 volts respectively. It is noted that the manufacturer of sensors 40, Nonvolatile Electronics, Incorporated (NVE), 11409 Valley View Road, Eden Prairie, Minn. 55344-3617, has established a recommended range of about 0.75 to about 24 volts as input voltages for GMR sensors 40. But, applicants were able to successfully use sensors 40 with voltages ranging from about 1.5 to about 48 volts.

Three levels of sensor sensitivity were implemented in applicants' detector cluster design of FIG. 9 (the system may optionally employ more or less sensitivity levels or clusters), and were color-coded for illustration purposes:

The most sensitive sensors 40c (coded red) were fitted with 6 inch flux concentrators 52 and had input voltage of 36 volts from battery 48. Thus, sensors 40c were capable of detecting all inserted magnetically tagged particles 10, including those with the weakest magnetic implants 14.

The sensors 40b with medium sensitivity (coded green) were fitted with 4 inch flux concentrators 52 and had input voltage of 24 volts from battery 4G. Thus, sensors 40b were capable of detecting all inserted magnetically tagged particles 10 with the exception of those containing the weakest magnetic implants 14.

The least sensitive sensors 40a (coded blue) were not fitted with flux concentrators 52 and had input voltage of 12 volts from battery 44. Thus, sensors 40a were capable of detecting only those magnetically tagged particles 10 that were tagged with medium and large magnetic implants 14 (0.1 gram and above).

Thus, in combination with the sequential insertion of specifically tagged particles 10, the i.d. system was established. A particle 10 tagged with the smallest magnetic implant 14 would be detected only by the most sensitive (red) sensors 40c; a particle 10 tagged with the medium-sized magnetic implants 14 or multiple small magnetic implants 14 would be detected by sensors 40c and 40b ("red" and "green") whereas particle 10 tagged with relatively large/strong magnetic implants 14 or multiple small/medium magnetic implants 14 would be detected by all ("red", "green" and "blue") sensors 40c, 40b and 40a. In all cases an additional identification mechanism is the magnitude of the response of each sensor cluster.

The TESTPOINT™ software was customized to provide for a color graphical output from the data from the different sensors 40a, 40b and 40c. Thus, particular particles 10 were tracked according to the color-coding described above.

It is noted that the sensors 40 of the gasket configuration of the system of this invention as described in FIGS. 7 and 8 can be customized to detect particular ranges of magnetic identifications in a similar manner as just described.

Detection of Particle in a Package for Removal

Figure 10:
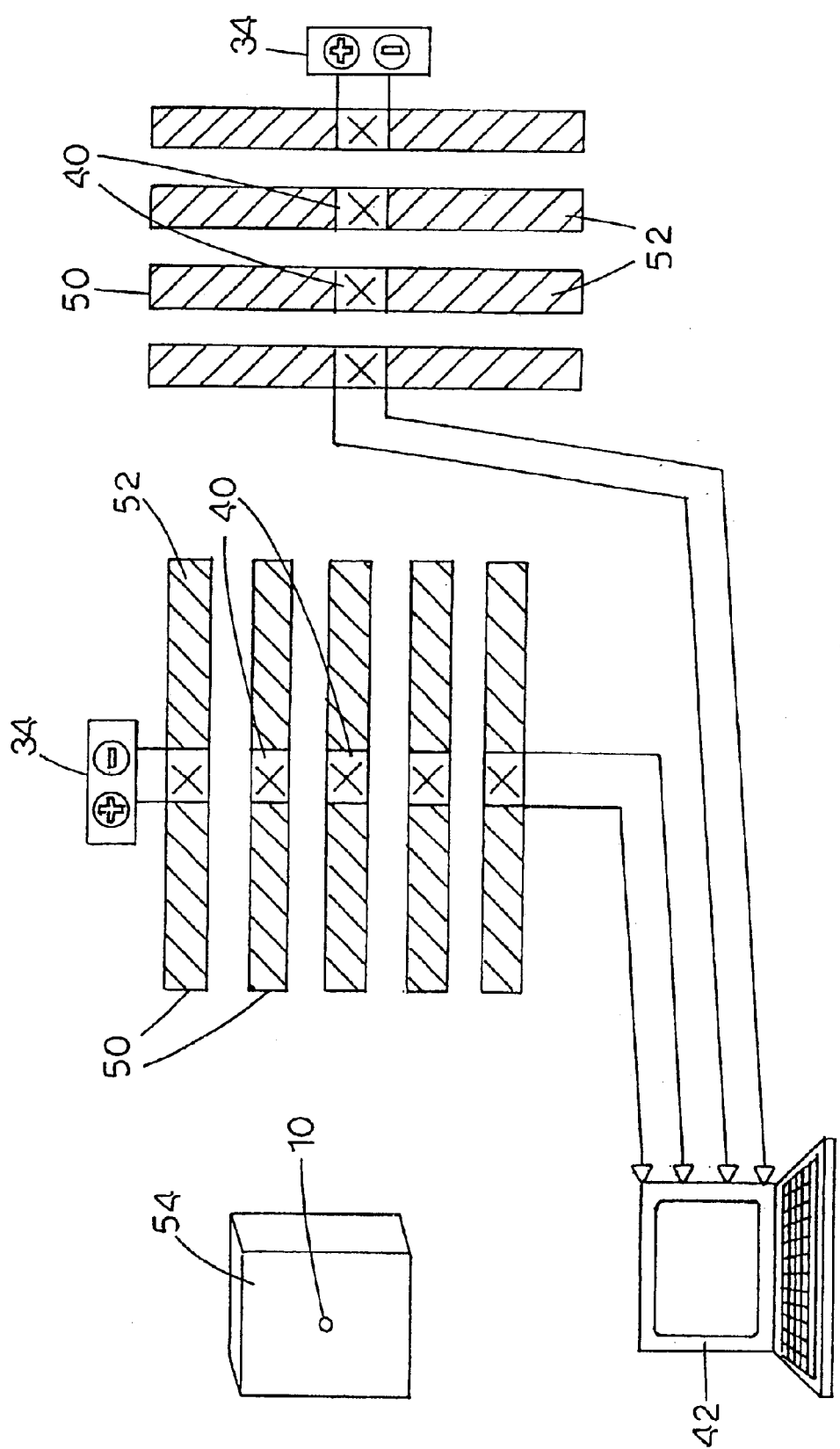
FIG. 10 is a schematic of a second alternative embodiment of the system of this invention.
Figure 11:
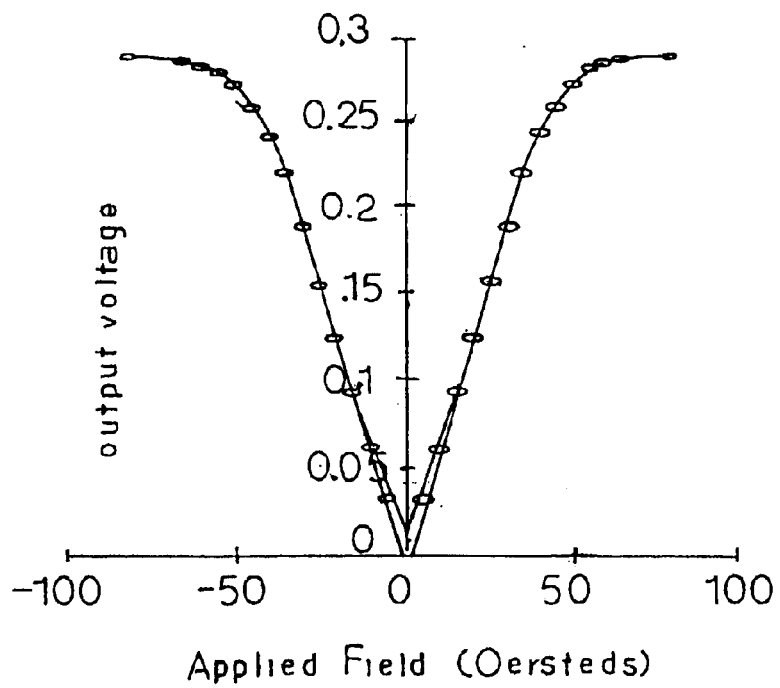
FIG. 11 is a graphical presentation of giant magneto-resistive (GMR) sensor output characteristics.

Referring now to FIG. 10, a further alternative configuration for the sensors of the method and system of this invention is depicted. In this configuration, the particle 10 including a magnetic implant is detected in a package after the food stream is run through a continuous thermal processing line and packaged. The package 54 containing the particle 10 is removed from the line.

Other packages that do not contain particles 10 then move along the line and, assuming residence time measurements and/or other thermal treatment evaluations, such as microbial culturing from an inoculum pack such as inoculum pack 18 described above, or data from a thermal memory cell such as thermal memory cell 20 described above, indicate sufficient lethality, can be sold to consumers. Thus, it is contemplated that the method and system of this invention can be used in generating residence time measurements, biovalidation calculations and other thermal history data during the continuous thermal processing of a food product that is to be sold to consumers. Stated differently, it is contemplated that the method and system of this invention can be implemented under normal processing run conditions to evaluate thermal treatment as a part of the regular quality control procedure for regular production runs, in addition to facilitating fulfillment of requirements for a process filing as required by the FDA.

Referring then to FIG. 10, packages 54 are moved along a conveyor belt (not shown in FIG. 10). Straps 50 including GMR sensors 40 and flux concentrating material 52 are placed proximate to the conveyor belt. Batteries 34 are operatively connected to sensors 40. Outputs from sensors 40 are directed to computer acquisition system 42. Maximum sensitivity sensors 40 are used in this embodiment.

Particle 10 in a single package 54 is detected, and an appropriate signal reaches computer 42. Computer 42 then provides a signal to a user as to which package 54 includes the particle 10 so that it can be removed from the line.

Tables 3–6 below summarize preferred system dynamics, including injection dynamics. Tables 3–6 also set forth magnetic identification data for the particles in the food flow.

TABLE 3

Insertion dynamics
Basic system

40 L/min flow rate
40 m hold tube (2 in. i.d.)
Particles at average fluid velocity
Other flow/length settings

TABLE 4

Insertion dynamics (basic)

40 L/min; 2 in; 40 m; avg. velocity
Residence time 121.6 s
For 400 particles: 13.5 hours; 32,429 L
For 3 replicate runs: 40.5 hours; 96,288 L

TABLE 5

Insertion dynamics:
Programmed delay

Max. part. velocity = 2 * avg. vel.
(Residence time 60.8 s)
Min. part. velocity = avg. vel.
(residence time 121.6 s)
Minimum delay 60.8 s
For 400 particles:
  6.76 hours; 16,215 L
For 3 replicate runs;
  20.27 hours; 48,644 L

TABLE 6

Programmed delay + Magnetic I.D.

| I.D.s 400 particles | 3 runs |
| --- | --- |
| 1. 6.76 hr; 16,215 L | 20.27 hr; 48,644 L |
| 2. 3.38 hr; 8,107 L | 10.13 hr; 24,322 L |
| 3. 2.25 hr; 5,405 L | 6.76 hr; 16,215 L |

TABLE 6-continued

Programmed delay + Magnetic I.D.

| I.D.s 400 particles | 3 runs |
| --- | --- |
| 4. 1.69 hr; 4,053 L | 5.07 hr; 12,161 L |
| 5. 1.35 hr; 3,243 L | 4.05 hr; 9,728 L |

Figure 12:
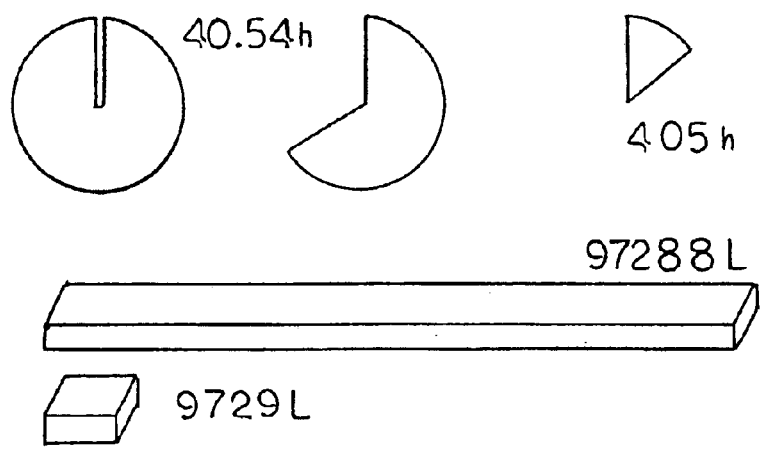
FIG. 12 is a graphical presentation of the time and product required to generate a residence time profile in a conventional method and system as compared to the method and system of this invention.

FIG. 12 is a graphical presentation of the hour and product amount data information derived from a residence time profile generated from a conventional thermal process (upper bar graph and pie chart on the left side of FIG. 12) as compared to the methods of this invention (lower bar graph and pie chart on the right side of FIG. 12). These graphs present the dramatic savings in time and product provided by the method and system of this invention.

The method and system of this invention provides for the use of magnetic tagging implants in combination with other sensing devices implanted in the particle (thermal memory cell, thermal pill, as described in *NASA Tech Briefs*, June 1990, p. 106), microbial loaded media or real food products. It additionally provides for the concurrent residence time measurement for the individual solid particle types for multi-phase products containing several different particle components (stews, vegetable mixes, soups, etc.).

Therefore, applicants' invention represents a significant advance over all previously available or tested methods in that it ensures reliable detection at all detection points and minimizes the time and product used through the application of calculated insertion delays and multiple particle identification types. Additionally, the simulated particle density is adjusted to the experimentally determined target density rather than an arbitrarily selected value such as initial or final particle density, initial carrier fluid density etc. This adjustment provides an improved level of safety against under-processing in a variety of processing geometries and configurations. No special inserts or viewing ports are necessary for detection and i.d. recognition. No special insertion device is needed—a first particle can be simply inserted into a hopper and the timing delay for the remaining particles can be started at the time of system entry detection.

It will be understood that various details of the invention may be changed without departing from the scope of the invention. Furthermore, the foregoing description is for the purpose of illustration only, and not for the purpose of limitation—the invention being defined by the claims.

What is claimed is:

1. A system for generating a residence time measurement for a particulate-containing food product while passing the product as a continuous stream through a thermal processing apparatus, the system comprising:
   (a) at least one detectable particle tagged with at least one detectable magnetic implant;
   (b) means for detecting the implant in the particle, the means comprising a gasket and at least one magnetic sensor mounted within the gasket;
   (c) means for determining a time of passage of the at least one detectable particle in the stream using output from the at least one sensor; and
   (d) means for generating a residence time measurement for the stream using the time of passage for each of the detectable particles.

2. The system of claim 1, wherein the means for detecting the implant further comprises a plurality of sensors mounted within the gasket.

3. The system of claim 1, further comprising a plurality of detectable particles, each particle including at least one magnetic implant.

4. The system of claim 3, wherein the means for detecting the implant further comprises a plurality of sensors mounted within the gasket.

5. The system of claim 4, wherein each of the sensors is calibrated according to a magnetic field of each of the detectable particles, such that each sensor detects a different range of particles.

6. A sensor assembly for use in measuring residence time for a particulate-containing food product while passing the product as a continuous stream through a thermal processing apparatus, the sensor assembly comprising a gasket and at least one magnetic sensor mounted within the gasket, wherein the gasket is adapted for placement proximate to the continuous stream such that the flow of the particulate-containing food product is unobstructed.

7. The sensor assembly of claim 6, further comprising a plurality of sensors mounted within the gasket.

8. The sensor assembly of claim 6, further comprising a plurality of sensors mounted around an inner periphery of the gasket.

* * * * *